US011755790B2

(12) United States Patent
Hancock et al.

(10) Patent No.: US 11,755,790 B2
(45) Date of Patent: Sep. 12, 2023

(54) SYSTEM AND METHOD OF BRIDGING 2D AND 3D ASSETS FOR PRODUCT VISUALIZATION AND MANUFACTURING

(71) Applicant: AMERICA'S COLLECTIBLES NETWORK, INC., Knoxville, TN (US)

(72) Inventors: Christopher W. Hancock, Knoxville, TN (US); Jill M. Goodson, Knoxville, TN (US)

(*) Notice: Subject to any disclaimer, the term of this patent is extended or adjusted under 35 U.S.C. 154(b) by 0 days.

(21) Appl. No.: 17/162,096

(22) Filed: Jan. 29, 2021

(65) Prior Publication Data

US 2021/0232720 A1 Jul. 29, 2021

Related U.S. Application Data

(60) Provisional application No. 62/967,327, filed on Jan. 29, 2020.

(51) Int. Cl.
| | |
|---|---|
| *G06T 19/00* | (2011.01) |
| *G06F 30/10* | (2020.01) |
| *G06T 15/50* | (2011.01) |
| *G06F 30/17* | (2020.01) |
| *G06F 30/12* | (2020.01) |

(Continued)

(52) U.S. Cl.
CPC .............. *G06F 30/17* (2020.01); *G06F 30/12* (2020.01); *G06T 15/205* (2013.01); *G06T 15/50* (2013.01); *G06T 19/00* (2013.01); *A44C 27/00* (2013.01); *G06F 2111/16* (2020.01); *G06Q 30/0621* (2013.01)

(58) Field of Classification Search
None
See application file for complete search history.

(56) References Cited

U.S. PATENT DOCUMENTS

| 8,194,069 B2 | 6/2012 | Thomas-Lepore |
| 8,977,377 B2 | 3/2015 | Saarela |

(Continued)

FOREIGN PATENT DOCUMENTS

| EP | 2717226 A1 | 4/2014 |
| WO | 2001/93156 A1 | 6/2001 |

(Continued)

OTHER PUBLICATIONS

International Search Report and Written Opinion of the International Searching Authority for Co-Pending Application PCT/US 21/15778, dated Apr. 29, 2021.

*Primary Examiner* — Joni Hsu
(74) *Attorney, Agent, or Firm* — America's Collectibles Network, Inc.

(57) ABSTRACT

A product visualization and manufacturing system and method which bridges two-dimensional (2D) and three-dimensional (3D) technologies in order to quickly and effectively display the product. The system and methods are helpful for many different product types, but especially for custom-designed jewelry products. The 2D/3D bridging invention enables a user to generate a three-dimensional generic base model of a product, modify the three-dimensional generic base model using two-dimensional image manipulation, and display a three-dimensional customized base model of a customized product. Templates, material libraries, HDRI maps, and lighting schemes may be employed.

19 Claims, 25 Drawing Sheets

(51) Int. Cl.
*G06T 15/20* (2011.01)
*A44C 27/00* (2006.01)
*G06F 111/16* (2020.01)
*G06Q 30/0601* (2023.01)

(56) References Cited

U.S. PATENT DOCUMENTS

| | | |
|---|---|---|
| 9,165,409 B2 | 10/2015 | Nigam |
| 9,208,265 B2 | 12/2015 | Wells |
| 9,217,996 B2 | 12/2015 | Saarela |
| 9,224,234 B2 | 12/2015 | Nigam |
| 9,501,861 B2 | 11/2016 | Manoj |
| 10,026,208 B2 | 7/2018 | Nigam |
| 10,535,170 B2 | 1/2020 | Nigam |
| 2001/0026272 A1 | 10/2001 | Feld |
| 2002/0032546 A1 | 3/2002 | Imamura |
| 2006/0200269 A1 | 9/2006 | Saarella et al. |
| 2009/0021513 A1 | 1/2009 | Joshi |
| 2010/0169059 A1 | 7/2010 | Thomas-Lepore |
| 2011/0216062 A1 | 9/2011 | Thomas-Lepore |
| 2012/0304129 A1* | 11/2012 | De Francesco .... G06Q 30/0621 715/849 |
| 2012/0327084 A1 | 12/2012 | Thomas-Lepore |
| 2012/0331422 A1 | 12/2012 | High |
| 2013/0286014 A1 | 10/2013 | High |
| 2015/0015581 A1 | 1/2015 | Lininger |
| 2015/0055085 A1 | 2/2015 | Fonte et al. |
| 2015/0310135 A1* | 10/2015 | Forsyth .................. G06F 30/13 703/1 |
| 2017/0276612 A1* | 9/2017 | Gaywala .......... G06K 19/06028 |
| 2019/0102815 A1 | 4/2019 | Norman |
| 2019/0122279 A1 | 4/2019 | Mordovskoi et al. |

FOREIGN PATENT DOCUMENTS

| | | |
|---|---|---|
| WO | 2006/054992 A1 | 5/2006 |
| WO | 2011/046976 A1 | 4/2011 |

* cited by examiner

250

SYSTEM AND METHOD OF BRIDGING 2D AND 3D ASSETS FOR PRODUCT VISUALIZATION AND MANUFACTURING

CROSS REFERENCE TO RELATED APPLICATION

This application claims the benefit of U.S. provisional patent application 62/967,327, filed Jan. 29, 2020, the disclosure of which is hereby incorporated by reference in its entirety.

BACKGROUND

Increasingly, the product displayed to consumers when shopping are not 'real' and have not been manufactured yet, but simply images of the item prior to it being manufactured. As consumer demand increases for customized options, the manufacturing of multiple possible product variations is both cost and time inefficient. To that end, allowing a user to customize and visualize a product prior to it being manufactured and/or ordered is desirable. The consumer desire to view products from multiple angles, while in motion and in interactive ways has also increased. Displaying items in a photorealistic way prior to their creation using CAD and rendering is well documented in the art. Traditionally an item is 'drawn' using 3D design software. The item is then rendered within an environment that mimics a life-like scenario. The environment usually consists of lighting and a scene with objects on which the lighting bounces. The objects within the environment can cast reflections onto the object that is being rendered resulting in a more photorealistic result. The environment is typically optimized to reduce the need to re-touch and enhance the final image. Items are rendered to specification of the final product. Examples of this are different colors, textures, materials, or sizes.

Generally, the larger the number of variables available for customization, the more difficult, time consuming, and/or data intensive it is to create and store the visualization assets. In addition, the computation required to analyze and calculate light as it passes through and/or bounces from object to object (reflection) is critical in creating photorealistic representations of an item or items. The time and computer resources required may vary widely from an opaque, simple geometrical solid (for instance, a handbag which may comprise 12 faces) to an object comprising highly reflective, translucent and highly complex geometrical solids (for instance, a jewelry item with multiple gemstones each of which may comprise 58 faces).

Currently, the process by which an object is rendered consists of taking the object and dividing it into layers. Each layer must be rendered into all possible specifications and material options, resulting in an archive of all image layers in every possible iteration. These images are then stored on a server so that the material option for each layer can be loaded from the server and the object can be displayed in a variety of appearances. Each material on each layer is stacked to create the final object in any of the possible material iterations of the design. Rendering each and every layer of an object is both time consuming and data intensive. Furthermore, creating images from multiple angles, or sequences of images that when combined together create animations or interactive ways of viewing a product in each and every possible material iteration becomes impossible and or prohibitive due to timeline requirements and processing resource requirements required to generate all of the possible iterations for all of the images required within an image or animation.

A product that is being displayed can be representative of the brand(s) under which it is being sold. Lighting, backgrounds, materials, shadows etc. are important aspects of the final imagery. Each and every parameter within the environment can be altered to elicit drastically different results in the images or series of images, including but not limited to: the direct and indirect lighting, the HDRI map, the material library, the ground plane (surface on which an item sits), the shadow, etc. There is a desire for a brand to be able to customize these parameters to display products to customers which embody the brand's look and feel, or brand equity.

As consumer demand for manufacturing a lot size of one (i.e., custom products) has grown, so has the need to create efficient processes and robust systems that both create and display digital models for manufacturing. There is a need to bridge three-dimensional ("3D") and two-dimensional ("2D") technology to allow consumers to easily, quickly, and conveniently engage with products by customizing them online. There is a desire to reduce the time needed to create all of the layers and image variations of a typical customized product. Instead of creating all of the layers and variations beforehand and storing them in a database, there is a need for a faster and less-storage-intensive method of customizing products.

There is a desire to reduce the number of image variations stored within a database. There is a need for a computer or mobile application which does not time out due to processor limitations while trying to handle the current multi-layered rendering approach. There is a need to enable consumers to customize increasingly elaborate or intricate products without further causing storage and speed issues. There is a desire for a customization process which loads, or displays, customized choices on a screen quickly yet behind-the-scenes still creates a robust manufacturing model. There is a need to help designers display their products that reflect their brand or multiple brands under which the product is sold. There is a need to minimize the time and effort required to touch up or optimize product imagery. There is a desire to help manufacturers stay (or become more) lean via efficiency improvements in the process by which the 2D and 3D data is passed back and forth from the manufacturing entity to the entity customizing the product and back to the manufacturing entity.

SUMMARY

In accordance with embodiments of the present invention, systems and methods for enabling product visualization and manufacturing are provided. In one embodiment, the invention relates to a system of bridging two-dimensional and three-dimensional technologies for product visualization and manufacturing, comprising: one or more computer-readable storage mediums storing computer-executable instructions for controlling the computing system to complete the following steps, and one or more processors for executing the computer-executable instructions stored in the one or more computer-readable storage mediums. First, generate a three-dimensional generic base model of a product, wherein the generic base model comprises one or more three-dimensional generic subparts, wherein each generic subpart comprises one or more generic assets, wherein each generic asset can accommodate a range of parameters. Next, modify the three-dimensional generic base model using two-dimensional image manipulation, wherein a customized parameter selected from the range of parameters is assigned to a generic asset, thereby becoming a visualization asset, wherein the generic subpart is updated to incorporate the visualization asset, thereby becoming a customized subpart, and wherein the generic base model is updated to incorporate the customized subpart, thereby becoming a customized base model of a customized product. Then, display a three-dimensional customized base model of a customized product.

In a second embodiment, the invention relates to a method of bridging two-dimensional and three-dimensional technologies for product visualization and manufacturing, comprising: generating a three-dimensional generic base model of a product, wherein the generic base model comprises one or more three-dimensional generic subparts, wherein each generic subpart comprises one or more generic assets, and wherein each generic asset can accommodate a range of parameters. Next, selecting a customized parameter from the range of parameters, assigning the customized parameter to a generic asset to create a visualization asset using two-dimensional image manipulation, incorporating the visualization asset into a generic subpart to create a customized subpart, incorporating the customized subpart into the generic base model to create a customized base model of a customized product, and displaying a three-dimensional customized base model of a customized product.

Other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention.

BRIEF DESCRIPTION OF DRAWINGS

The drawings and detailed description that follow are intended to be merely illustrative and are not intended to limit the scope of the invention as contemplated by the inventors. The detailed description of specific embodiments of the present invention can be best understood when read in conjunction with the following drawings.

DETAILED DESCRIPTION OF THE INVENTION

Figure 1:
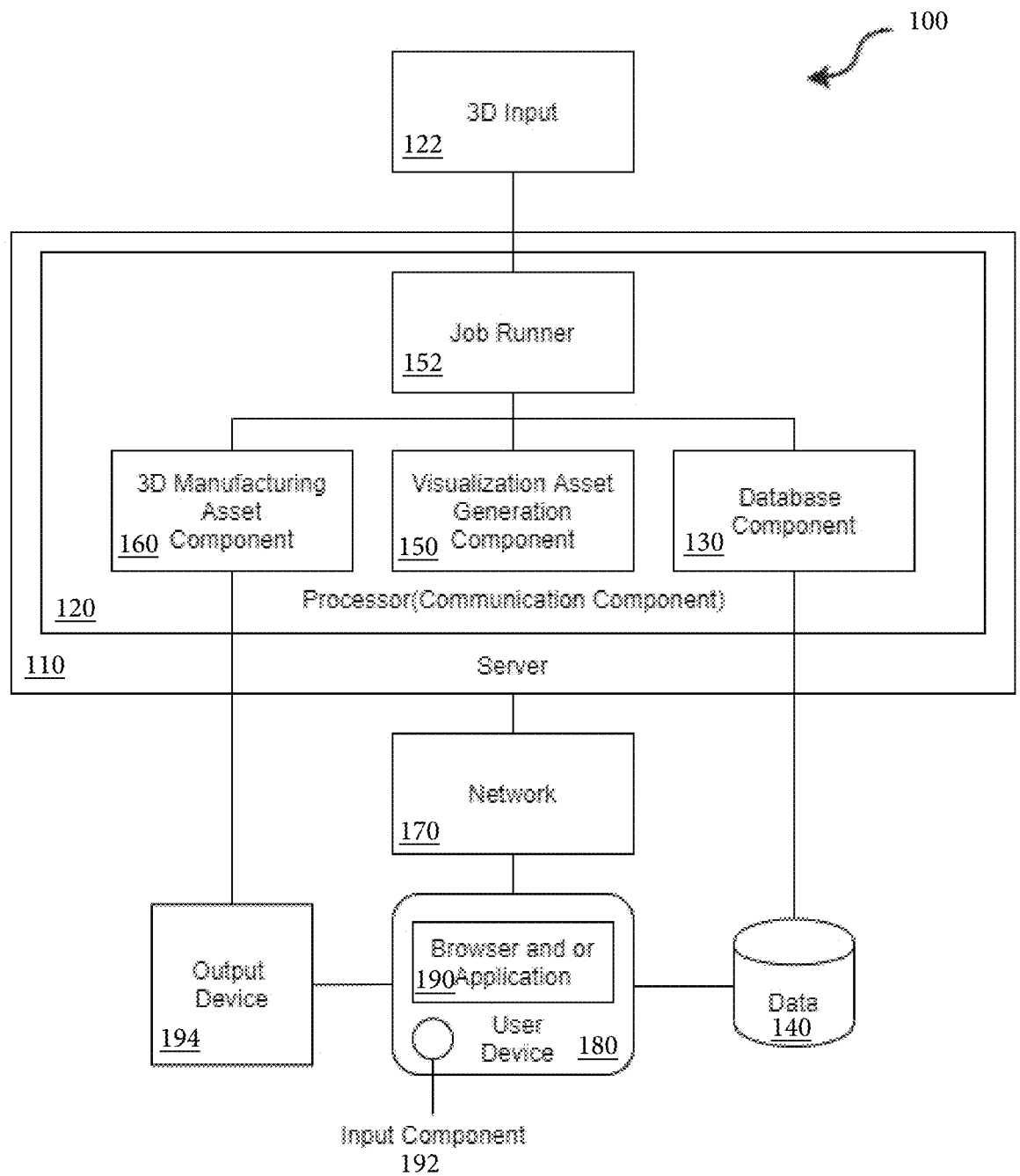
FIG. 1 shows a schematic block diagram of a computing device/system that can execute the computer instructions for the present invention.

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

While the disclosed applications of the inventors' systems and methods for enabling product visualization and manufacturing satisfy a long-felt but unmet need in the art of customized-product design, it should be understood that the invention is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The systems and methods of the present invention are capable of customizing a wide variety of products. In one embodiment of the present invention, the product is an article of jewelry such as a pendant, ring, earring, brooch, bracelet, necklace, watch, or the like. In other embodiments, it may be a handbag, footwear, hearing aids, lanyard, fashion accessory, or the like.

As consumer demand for manufacturing customized product increases, so does the need to create efficient processes and robust systems that both display the product and create the digital models for manufacturing. By bridging three-dimensional ("3D") and two-dimensional ("2D") technology while tracking the product data within a database, customers can engage with products by customizing them, and manufacturers can remain lean because of efficiency improvements in the process by which the 2D and 3D data is passed back and forth from the person manufacturing the product to the person customizing the product and back to the person manufacturing the product.

The new 2D/3D bridging approach provided by the present invention can reduce the time needed to create all of the image variations, because instead of creating all of the variations beforehand and storing them in a database, a generic Base Model (comprising multiple Subparts or in combination with another generic Base Model and its associated Subparts) of a product is created in a singular default base material which can be quickly and easily altered at the time of customization. By creating the Base Model and its subset of Subparts and their corresponding images in a generic material (for example, white polished material for an article of jewelry), customization can happen in 2D via image manipulation while being tracked in 3D for optimized efficiency. This bridging approach can eliminate the preparation time previously needed to create the Assets in all of the possible iterations. Furthermore, it can reduce the number of Assets stored within the database. And by tracking the customization changes that occur in 2D in both the database and within the 3D Base Model, it can further reduce the time for preparing the new customized Base Model for manufacturing the product because these edits are tracked and the 3D model already exists. This new approach is a win for the consumer and it is also a win for the manufacturer. The manufacturer can reduce overhead and eliminate the need to maintain a stock of items in hopes that the items will sell. The manufacturer can expand their product offerings while housing no physical merchandise. The manufacturer can eliminate the need to create a sample item to photograph for advertising their product. The manufacturer can eliminate the need for photography. The manufacturer can sell products via multiple channels from the same visualization asset while evoking multiple brand identities. The manufacturer can present the visualization asset in a variety of "looks" such as pencil sketch, napkin sketch, blueprint, photorealistic, cartoon, schematic, or combinations thereof.

With traditional systems, customizing and displaying a small number of Subparts (let alone a large number of Subparts, for instance while customizing family jewelry), is draining on resources. The more intricate or elaborate the product to be customized (such as jewelry), the slower the processing speed. The present invention enables more efficient customization of intricate, elaborate jewelry such as pendants, rings, earrings, brooches, bracelets, necklaces, etc. For instance, family jewelry often comprises multiple options for gemstone placement and selection. A family tree pendant may have many gemstones, one for each member of a family, so upwards of 5, 10, or 15 gemstones is possible. In various embodiments, the present invention allows for quick and easy customization of jewelry having any number of gemstones, such as at least 1 gemstone, at least 3 gemstones, at least 5 gemstones, at least 10 gemstones, or at least 15 gemstones.

As shown in FIG. 1, in one embodiment, a computing system 100 for creating a customized product 300 comprises 1) one or more computer-readable storage mediums 110 storing computer-executable instructions for controlling the computing system 100, and 2) one or more processors (aka communication component) 120 for executing the computer-executable instructions stored in the one or more computer-readable storage mediums 110. The computer-executable instructions allow the computing system 100 to consume 3D input 122, generate a 3D generic Base Model of a generic product, modify the 3D generic Base Model, and display a 3D customized Base Model of a customized Product and store all the data about the generic and customized Base Model. The Job Runner 152 is the conduit by which 3D input 122 is consumed, rejected, parsed out as data, optimized of manufacturing, optimized for visualization, etc.

As shown in FIG. 1, the computing system 100 includes a server computer 110, a processor (aka communication component) 120, a network 170, and a user device 180. The communication component 120 comprises a database component 130 which communicates with data 140, a visualization asset generation component 150, and a 3D-manufacturing asset component 160 which communicates with output device(s) 194 (see also FIG. 16A-C).

The processor (aka communication component) 120 is configured to couple with and control components in the user device 180. The user device 180 may be a computer, tablet, mobile device, smart TV, etc. comprising a web browser and/or application 190 which is able to communicate with other systems (e.g., web servers or other devices) via the network 170. In some embodiments, the user device 180 can communicate with an output device 194 (e.g., 3D printers, CNC milling machines, CNC routers, laser engravers, printers, kiosks, speakers, output devices, etc.) through the processor (aka communication component) 120. The output device could be located with the designer, the manufacturer and or the consumer. In a preferred embodiment the designer has the output device(s) 194 to design a generic and or customized Base Model(s) and Subparts, the manufacturer has the output device(s) to build and manufacture the generic and or customized Base Model(s), Subparts, and or products, and the consumer has the output device to order, pick up, price, try-on, etc. their generic and/or customized Product. Results of data queries are displayed in the browser/application 190.

One or more server computers 110 access data 140 containing information on products, Base Models, Subparts, Assets, Parameters, etc. In order to preserve integrity of information stored in data stores 140 and/or inhibit cyber-attacks, the server computer 110 preferably comprises one or more security features such as encryption, firewall systems, secure socket layers (SSL), password protection schemes, etc. The server computers 110 communicate with user devices 180 via the network 170. The user devices 180 may send search queries to the server computers 110 pertaining to unique items. The search queries are processed by the processor (aka communication component) 120 on the server computers 110 against the data in the data stores 140. The server computers 110 may retrieve, analyze, and format (e.g., in a format of a grid) unique item information that is responsive to the received search queries. The server computer 110 transmits data responsive to the search queries to a requesting user device 180 through the network 170.

The network 170 can be any private or public network, such as the Internet, an intranet, a wireless communication network, or a wired communication network. The processor (communication component) 120 is configured to receive an input (e.g., an instruction or a command) from the user device 180. The input component 192 can include a camera, keyboard, touch pad, stylus, touchscreen, remote control (e.g., a television remote), microphone, scanner, etc. The database 130 can include any type of computer-readable media that can store data 140 accessible to the processor 120, for example: random-access memories (RAMs), read-only memories (ROMs), flash memory cards, magnetic hard drives, optical disc drives, digital video discs (DVDs), cartridges, smart cards, etc.

The processor 120 comprises a database component 130 which communicates with data 140, a visualization asset generation component 150, and a 3D-manufacturing asset component 160. The database component 130 is configured to manage access to and maintenance of data stores 140. The visualization asset generation component 150 generates display information for the user device 180. The 3D-manufacturing asset component 160 generates 3D manufacturing information and can communicate and display information to the user device 180 and/or directly to the output device 194.

Data may be received from the server computer 110 via an application programming interface (API), and the received data formatted for display by the application on the user device 180. The server computer 110 and the user device 180 can include other programs or modules such as an operating system, one or more application programs (e.g., word processing or spread sheet), etc.

Figure 2A:
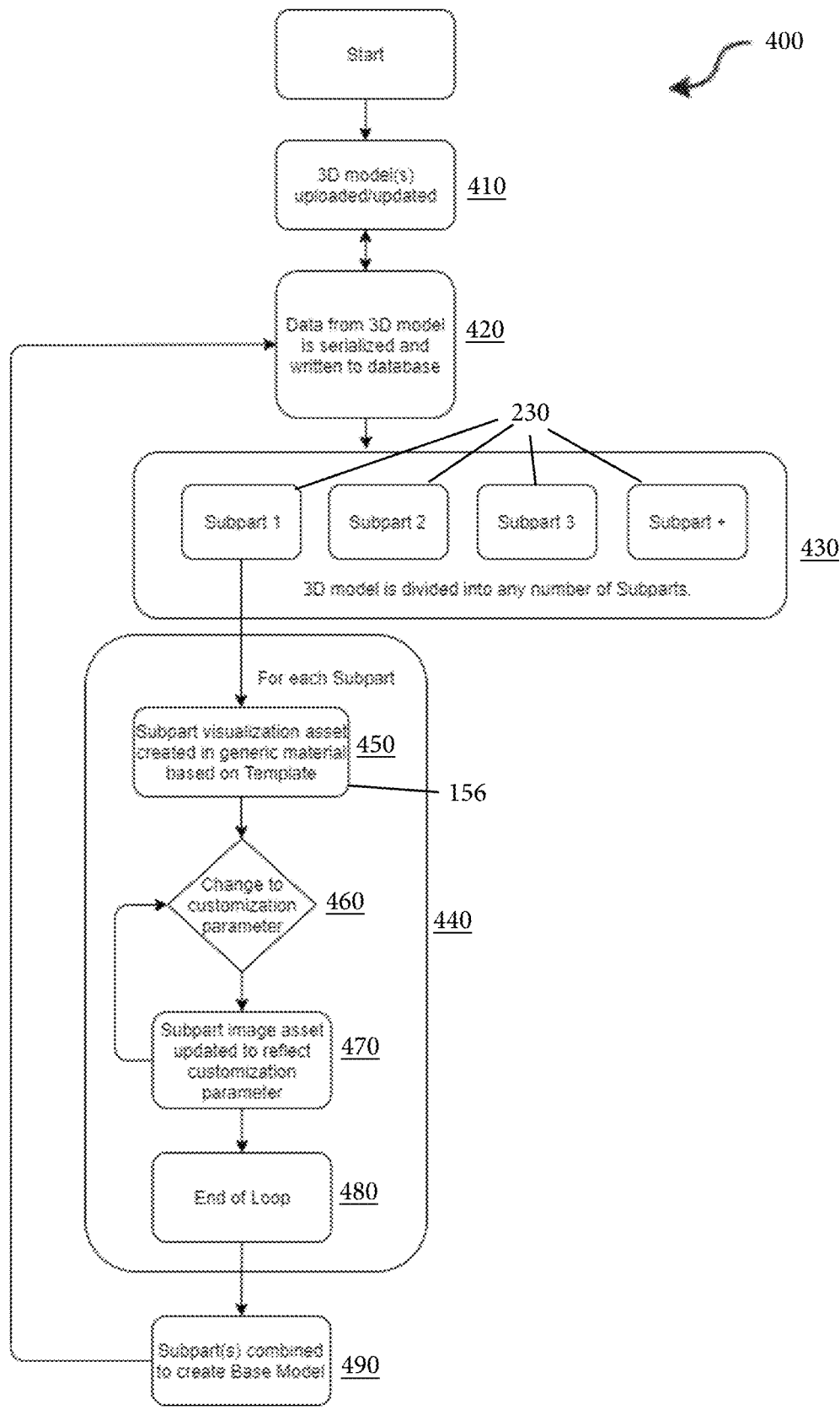
FIG. 2A shows a diagram of a process for product visualization and manufacturing according to one embodiment of the present invention.
Figure 11:
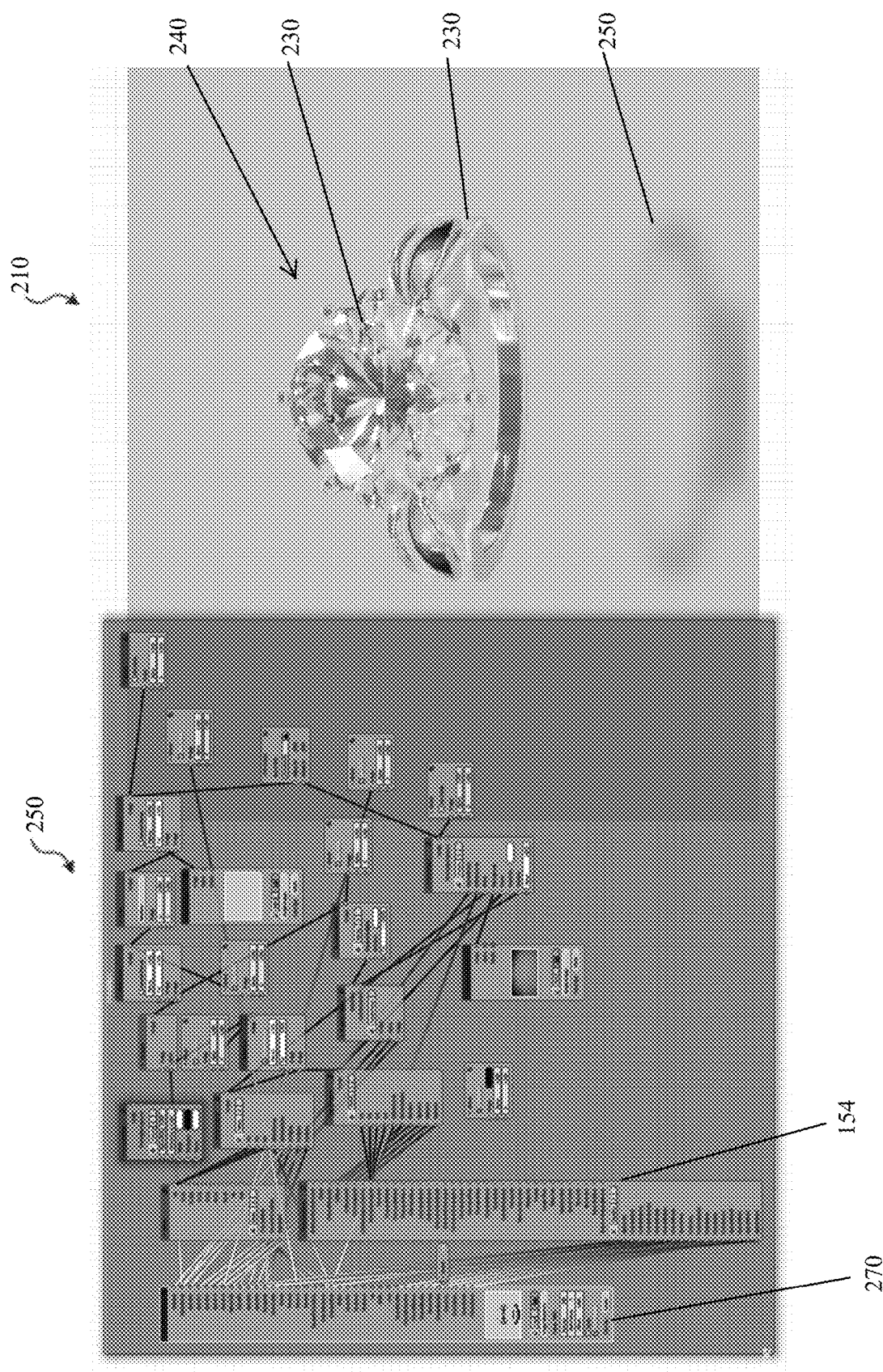
FIG. 11 shows an OpenEXR with its corresponding 2D generic Asset and a range of possible Parameters.
Figure 12A:
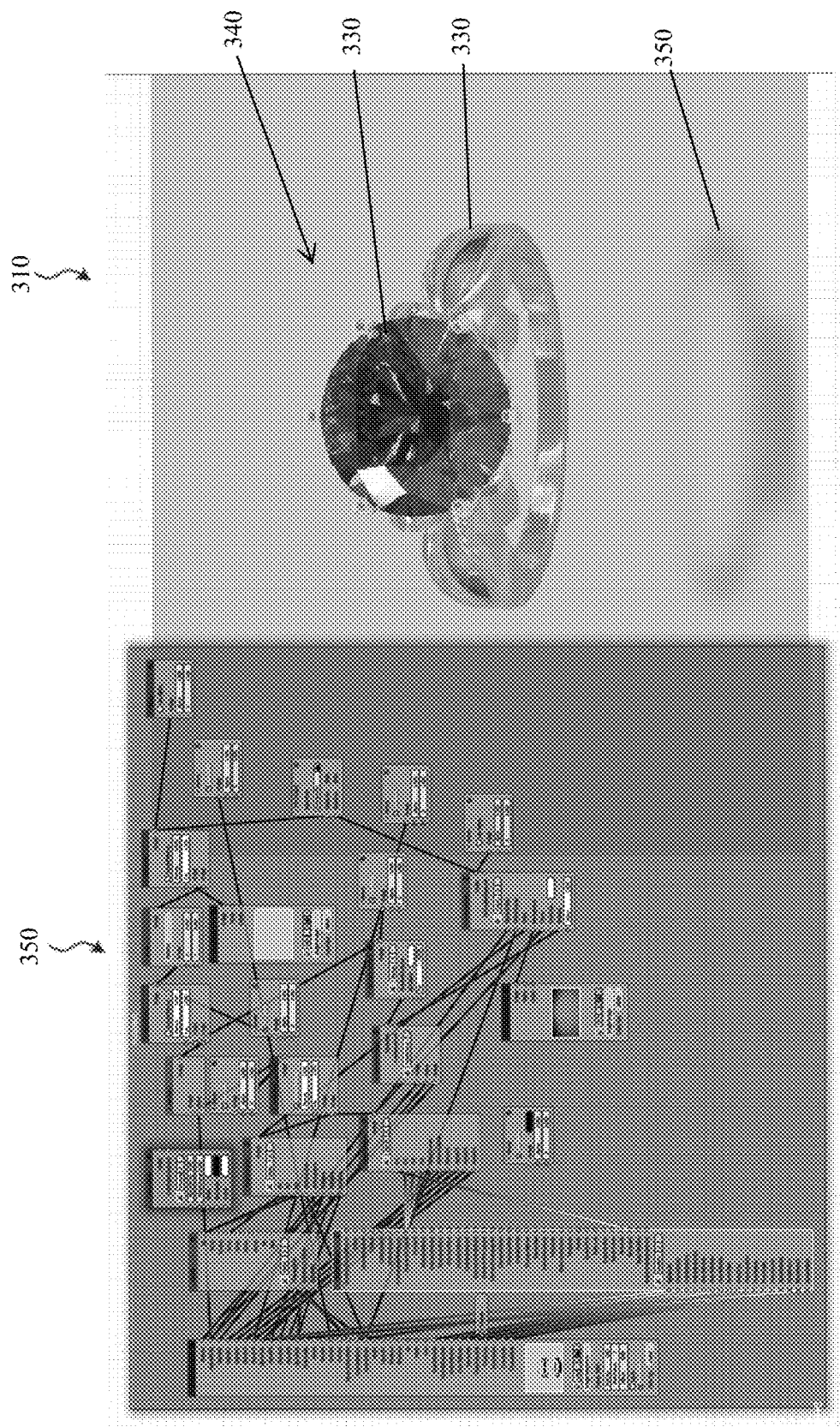
FIG. 12A shows sample customization of the generic base material as well as an exemplary material library.
Figure 12B:
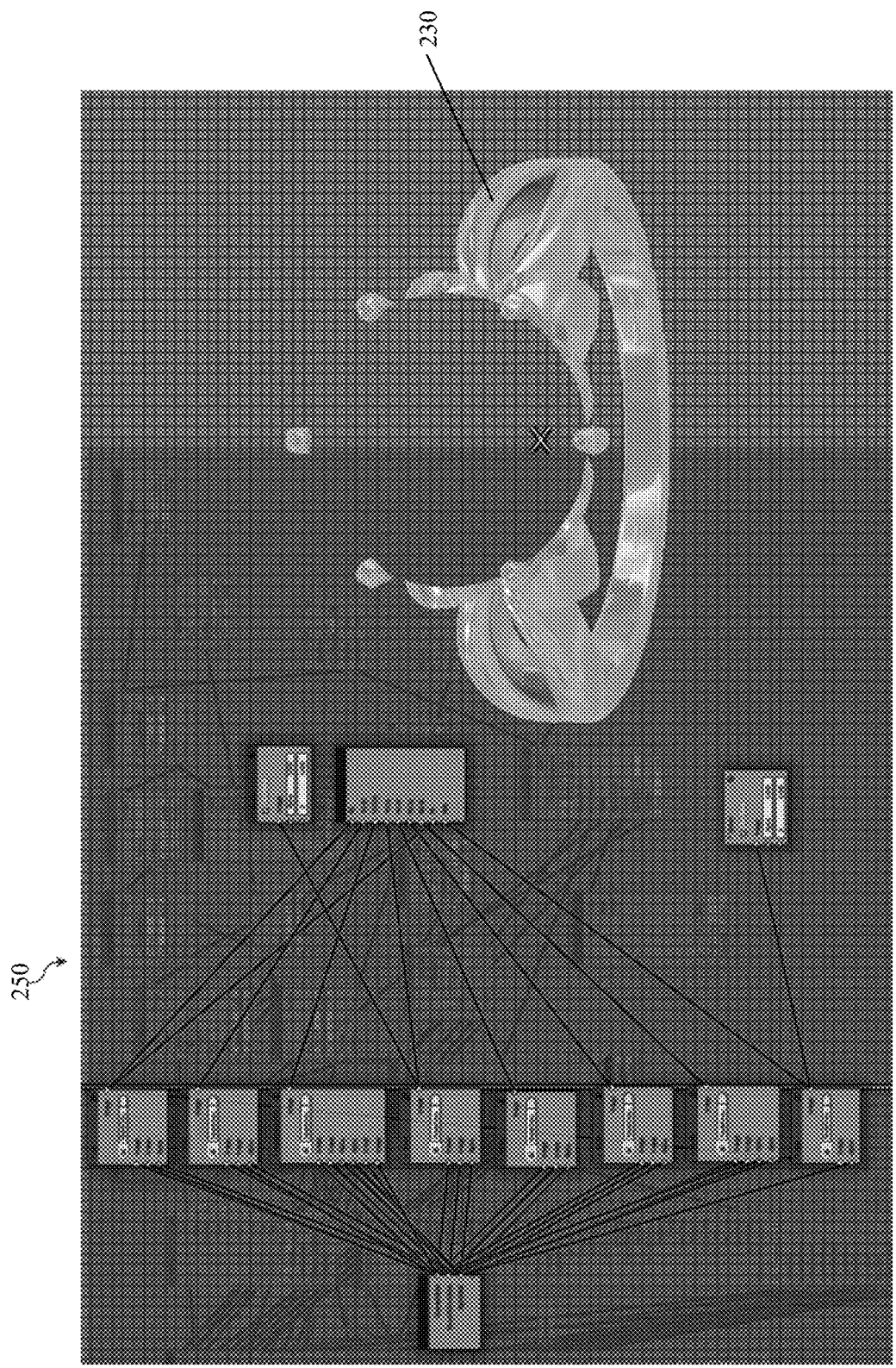
FIG. 12B shows a detailed view of sample pre-mixed metal materials to create possible metal iterations as seen in FIG. 12A.

FIG. 2A shows an embodiment of the basic method for product visualization and manufacturing according to one embodiment of the present invention. This method is executable by the visualization asset generation component 150 of the server computer/communication component 120 shown in FIG. 1. In one embodiment, the method comprises the follow steps: upload or update 410 a 3D generic Base Model 210, serialize and store 420 generic Base Model 210 data 140 in a database 130 (also shown in FIG. 3), assign 420 an Object ID 220 to each object within the 3D generic Base Model 210 (see FIG. 3), divide 430 the 3D generic Base Model 210 into any number of generic Subparts 230 (a Subpart can be a singular Object ID or comprise multiple Object IDs), specify 450 a Template 156 or one or more generic Assets 240 (such as generic materials) and assign them to each Object ID 220 and/or generic Subpart 230, review 440 material library and/or a range of Parameters 250 based on the 3D data and/or geometry type, choose 460 a customized Parameter 350 to assign to a generic Asset 240 (see FIG. 15A), update or generate 470 visualization Assets 340 to reflect the customized Parameters 350 (see FIG. 15B), continue to modify 460 the visualization Assets 340 as needed until the desired Subpart 330 results are achieved 480 (this step is also shown in FIGS. 11, 12A, 12B), combine 490 Subparts 330 to create customized Base Model 310 and update 420 the database 130 and/or local service/web service 176 (on a single server 110, or server to server) with the customized 3D Base Model 310 data 140 (see FIG. 2B). If using one or more Templates 156 and not requiring any additional customization, the steps relating to choosing Parameters may be skipped.

Figure 3:
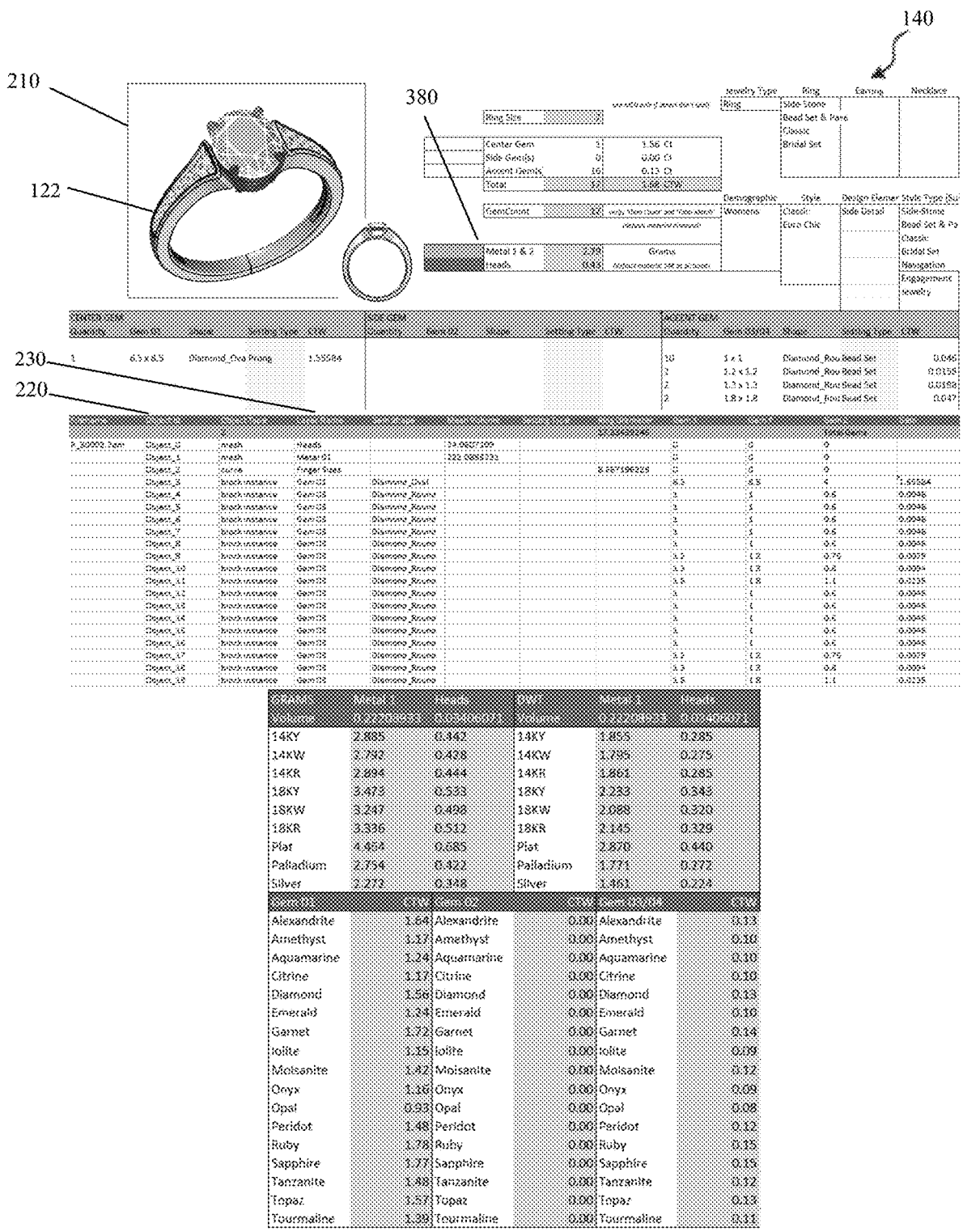
FIG. 3 shows sample data being read from a 3D Base Model.

FIG. 3 shows sample data being read from a 3D Base Model. An existing 3D model of a generic Product 200 awaiting customization, known as a generic Base Model 210, may be updated or uploaded into a web browser or application 190 on a user device 180 (see FIG. 1), for instance, as shown in FIG. 3. In a preferred embodiment of the present invention, the Base Model 210 is based on an article of jewelry such as a pendant, ring, earring, brooch, bracelet, necklace, or the like. The Base Model 210 of the jewelry may comprise the entire article, or only a portion of the article—for instance, an entire bracelet or only a customizable portion of a bracelet.

Figure 2B:
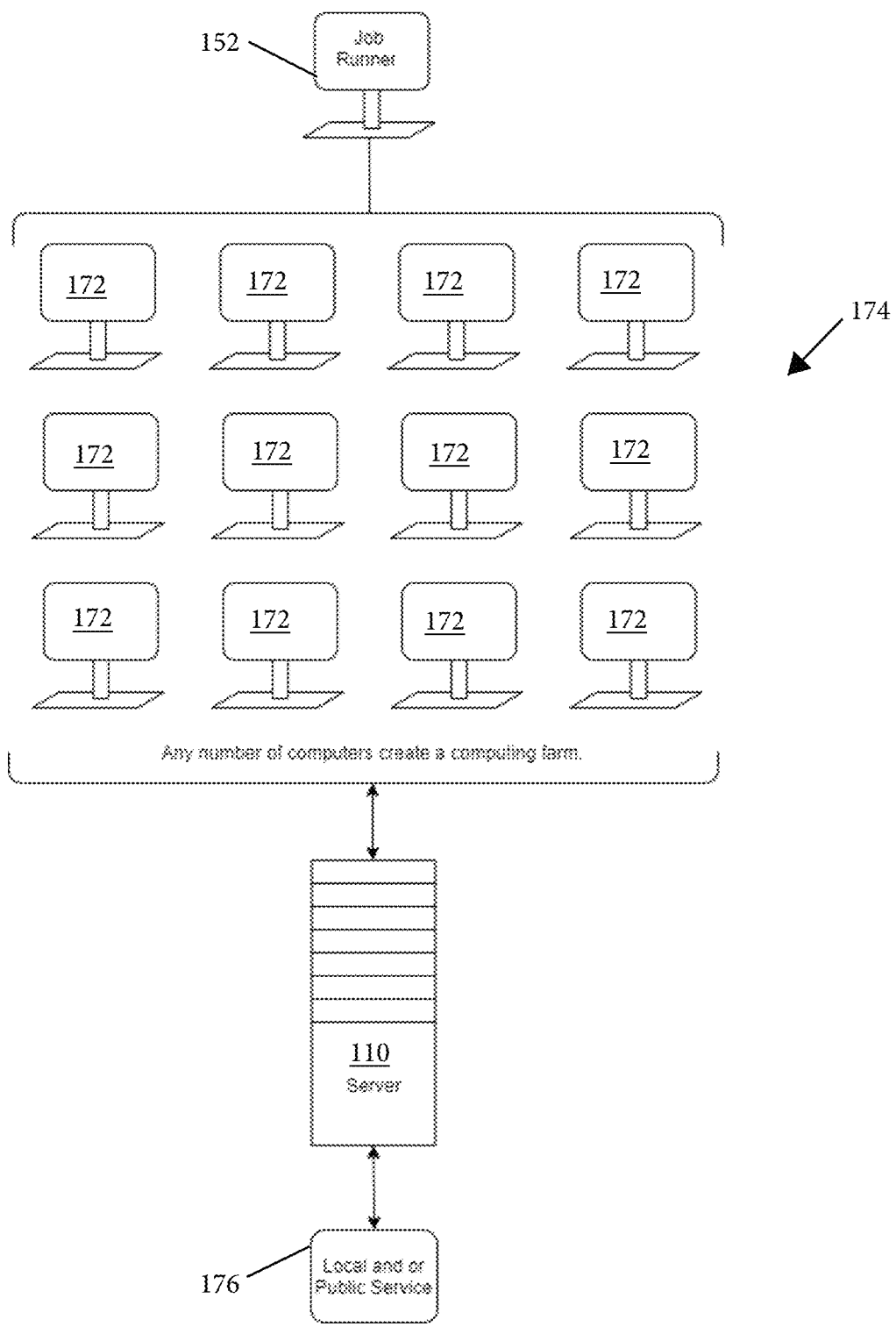
FIG. 2B shows a diagram of a Job Runner scheduling jobs to a computer farm and passing the data to and from a local and/or web server.
Figure 4:
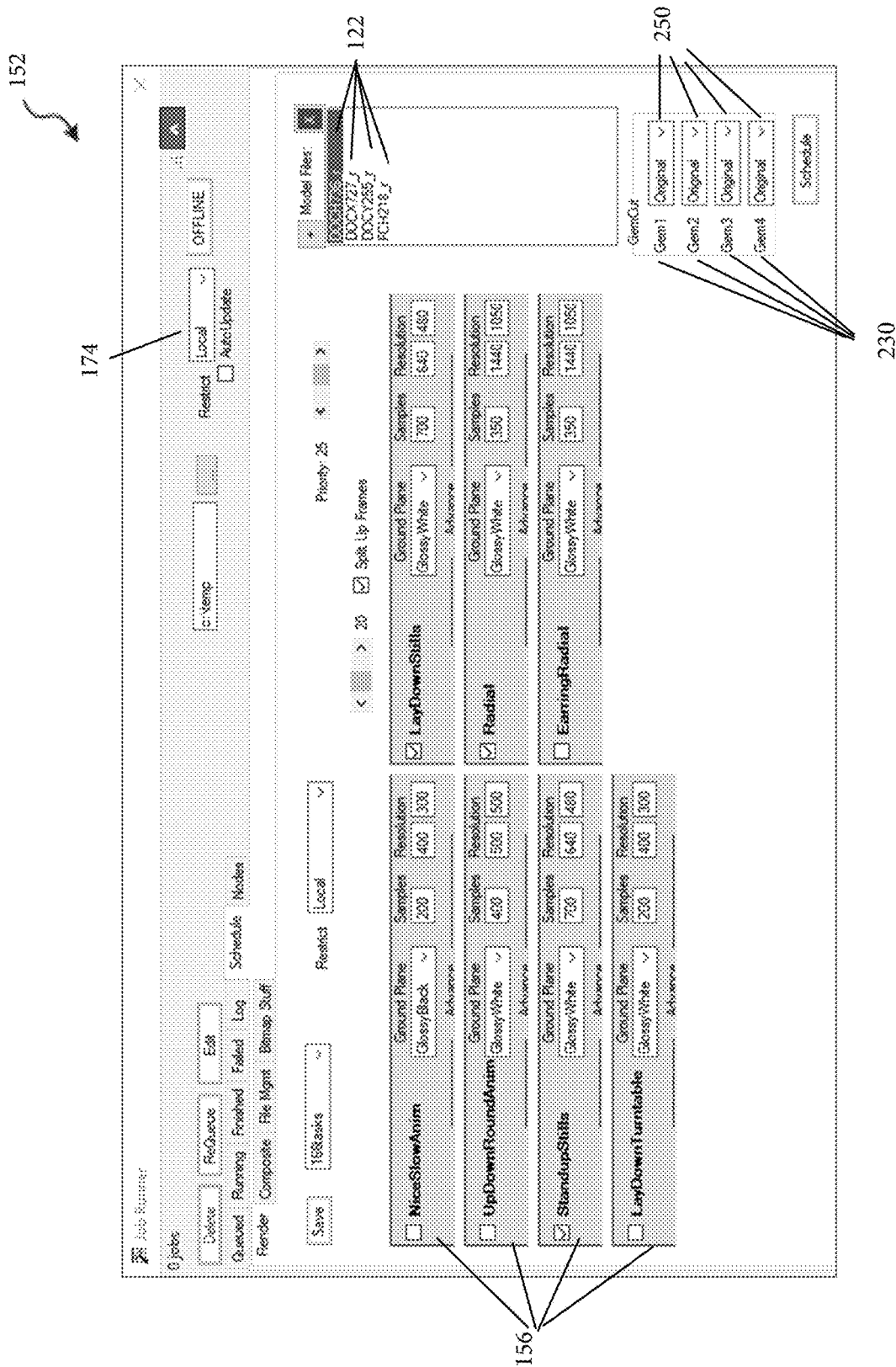
FIG. 4 shows a screen capture of the Job Runner application interface that processes batches of 3D models as described.

FIG. 4 shows a screen capture of a "Job Runner" software application 152 interface that processes batches of 3D models as described. The Job Runner 152 is functional with a variety of popular and common 3D 'packages', both open source and for sale in marketplace. The Job Runner 152 initiates tasks related to the database component 130 which communicates with data 140, the visualization Asset generation component 150, and the 3D-manufacturing asset component 160. These predefined tasks known as a 'Template' 156 prioritize CPU (central processing unit) and/or GPU (graphics processing unit) usage within the computing farm 174. The speed and quality of the specified Asset is optimized within a Template 156. In a preferred embodiment, the Template 156 that repairs mesh files utilizes a high-speed, single-core CPU system. In the preferred embodiment, the visualization Assets 240 are generated using a lower CPU but high GPU node within the computation farm (see FIG. 2B). The Job Runner application 152 (see FIG. 2B and FIG. 4) initiates a 3D platform capable of 3D modeling, rigging, animation, simulation, rendering, compositing, motion tracking, video editing and 2D animation. FIG. 2B shows a diagram of one embodiment of a Job Runner 152 scheduling jobs to computers 172 in a computing farm 174 and passing the data to and from a local 176 and/or web server 110.

Figure 5:
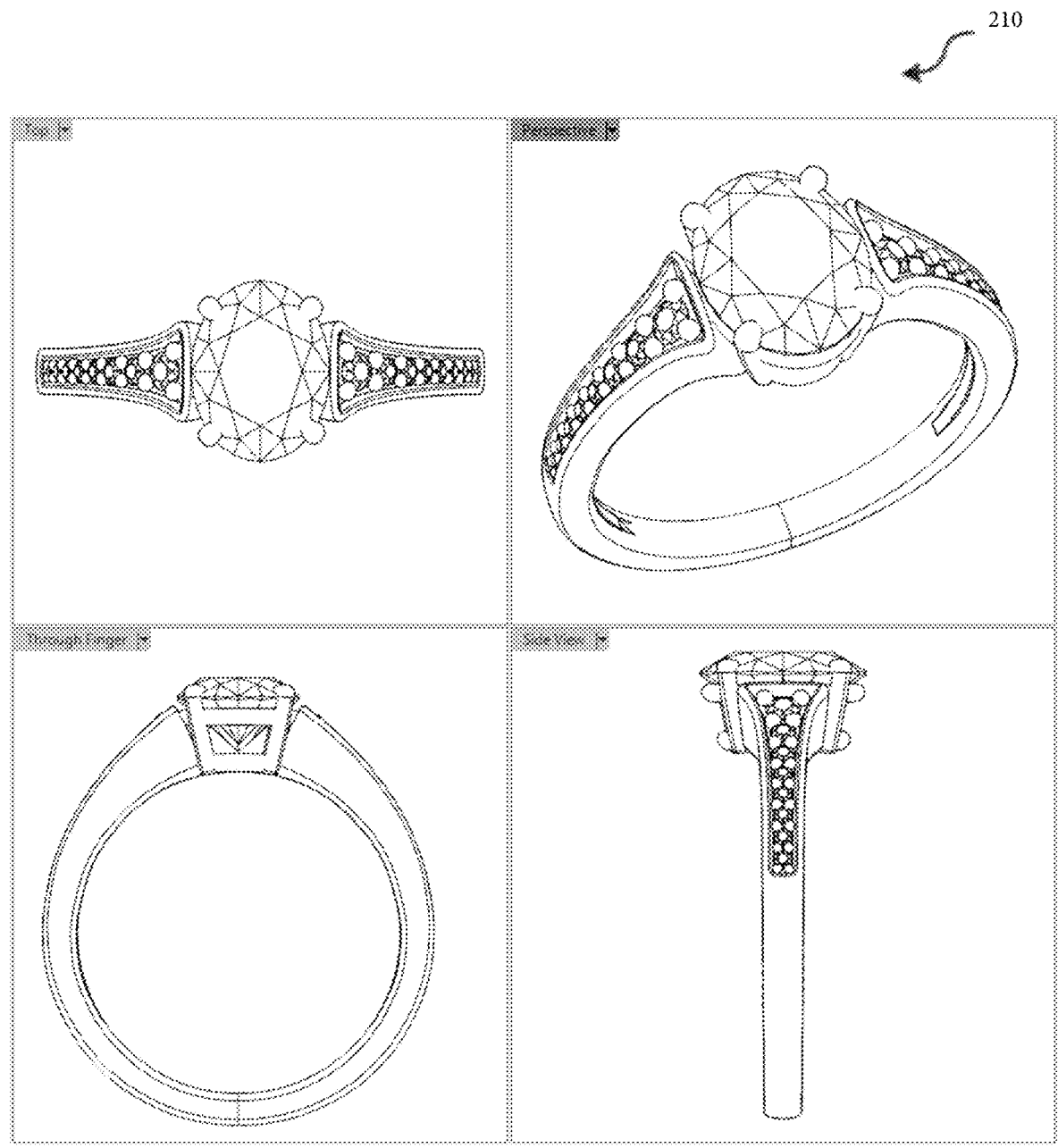
FIG. 5 shows a sample Base Model comprised of its Subparts as seen in FIG. 3.
Figure 6A:
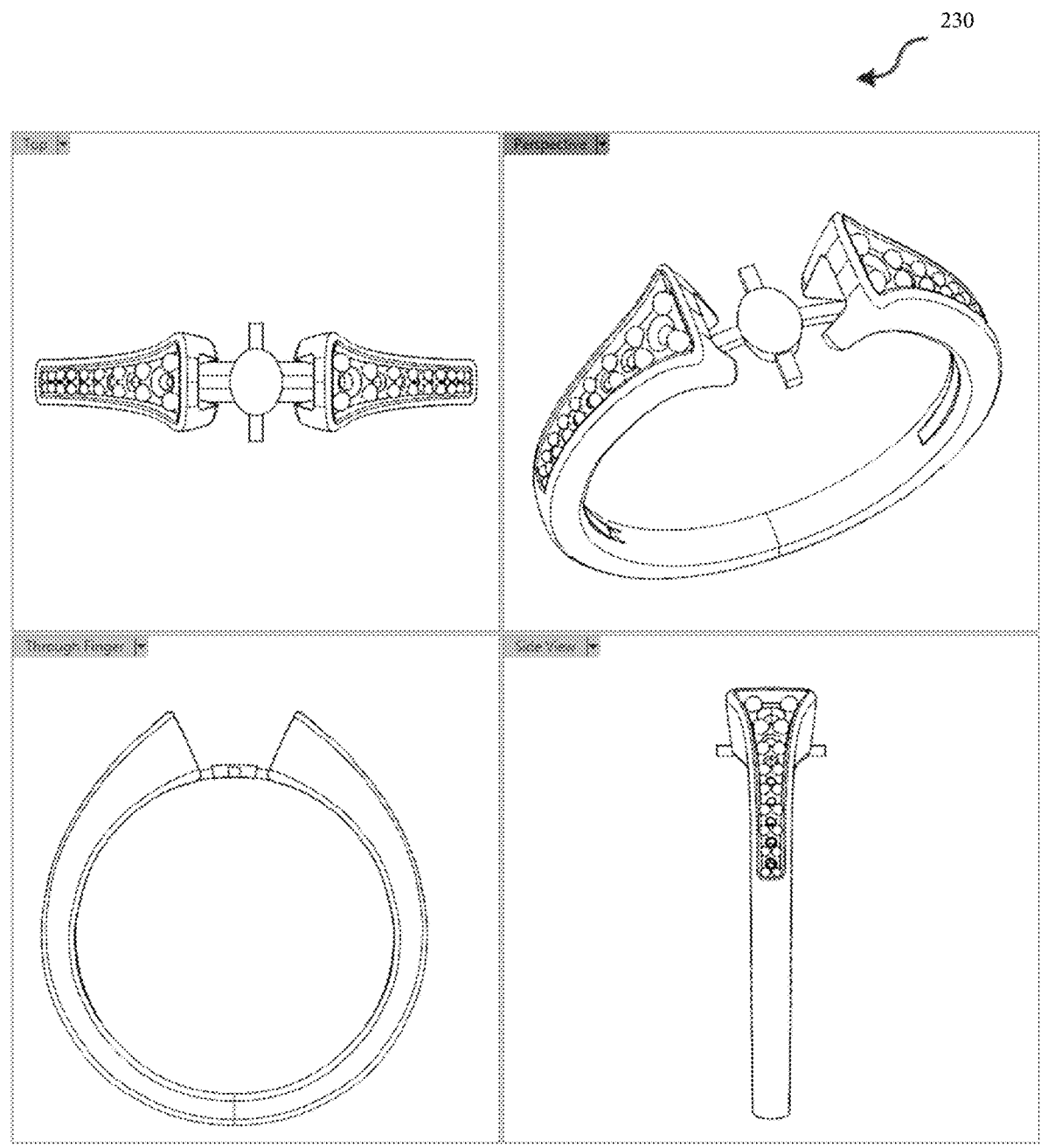
FIGS. 6A-6D show top, perspective, side, and through finger views of the Subparts of the 3D Base Model shown in FIG. 5.
Figure 6B:
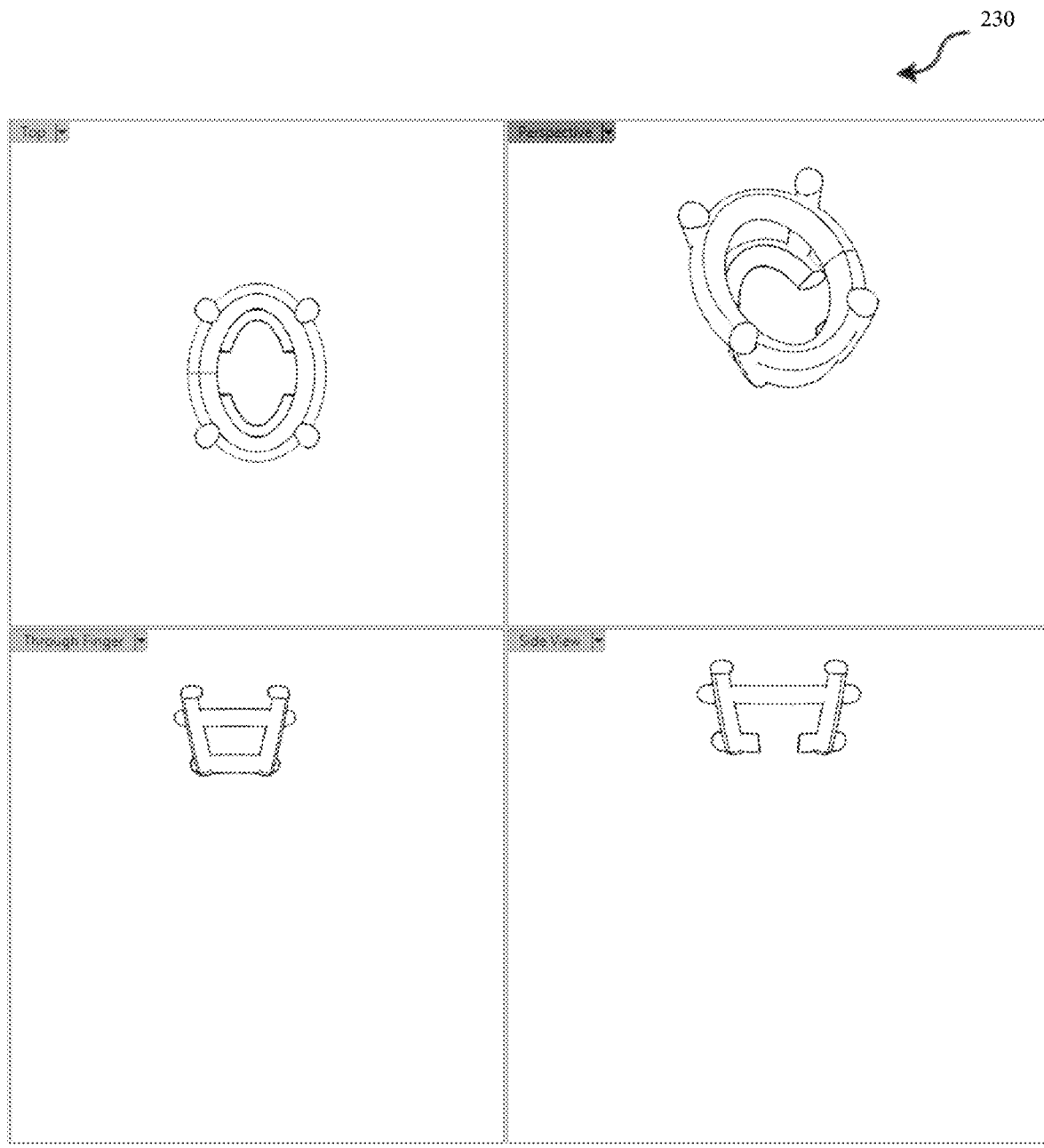
Figure 6C:
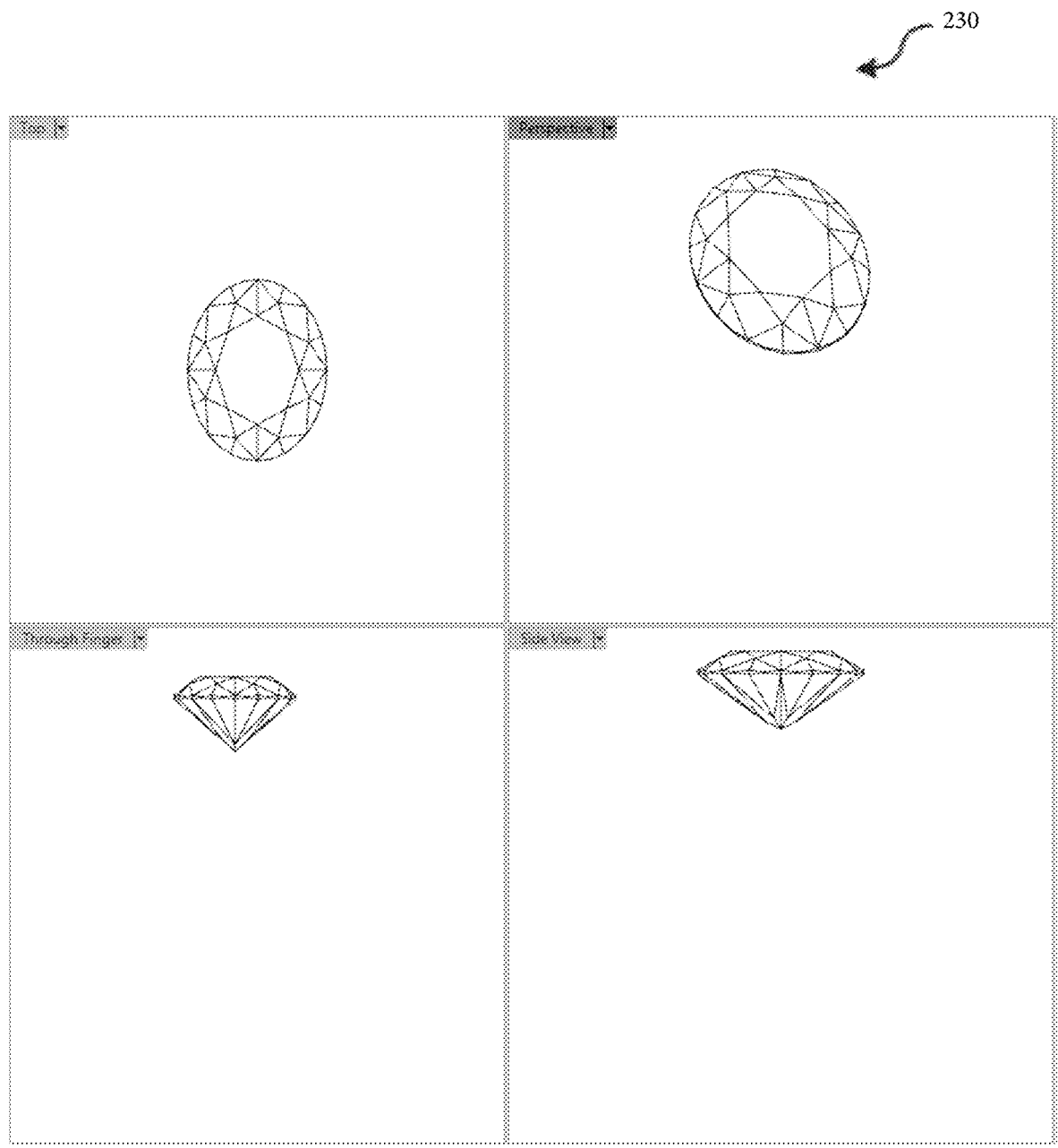
Figure 6D:
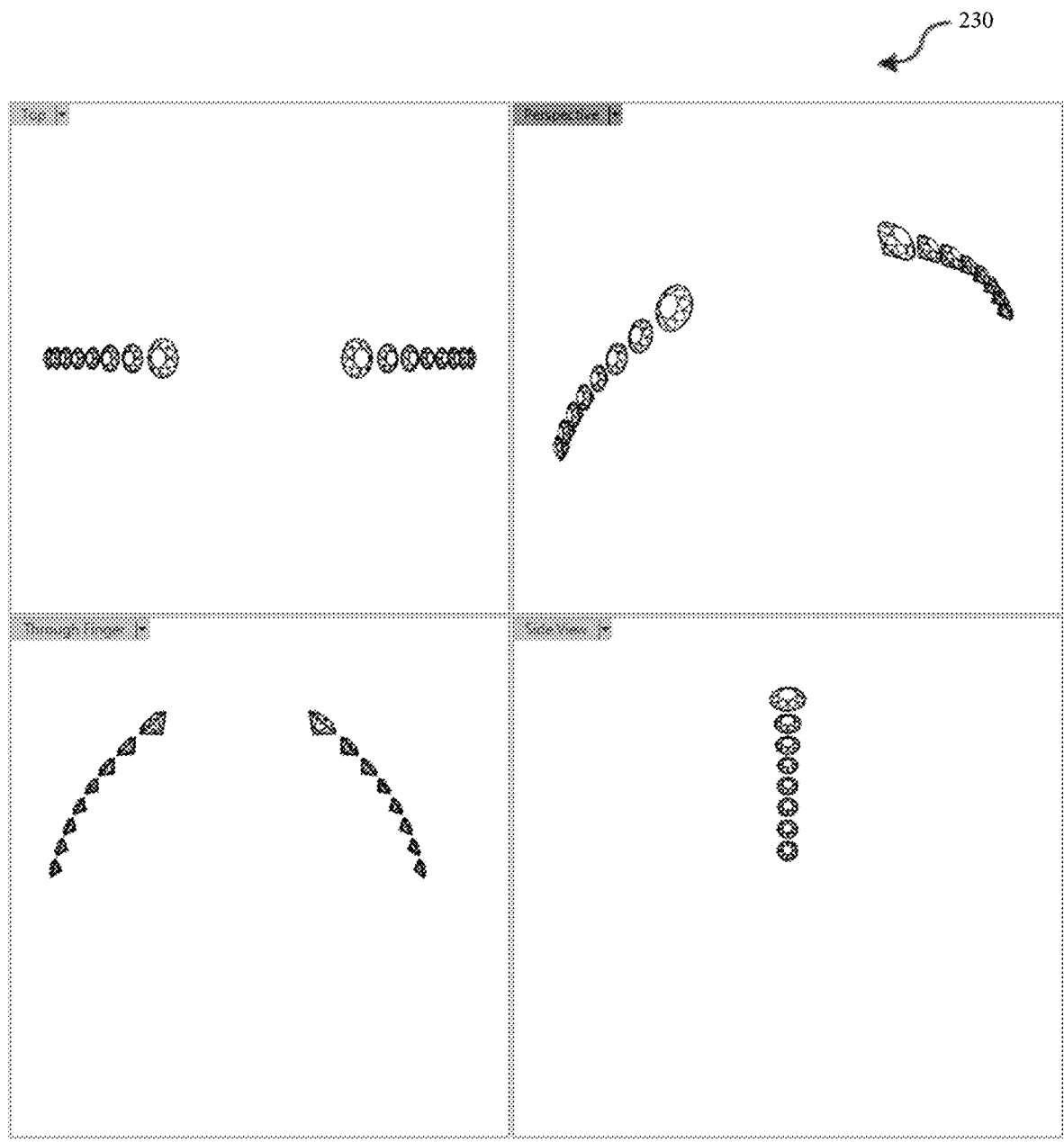
Figure 7A:
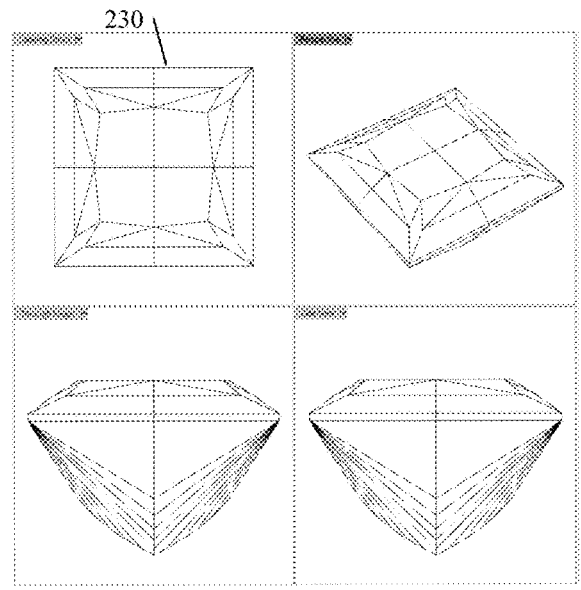
FIGS. 7A-7D show an exemplary gem Subpart exhibiting four different generic Assets.
Figure 7B:
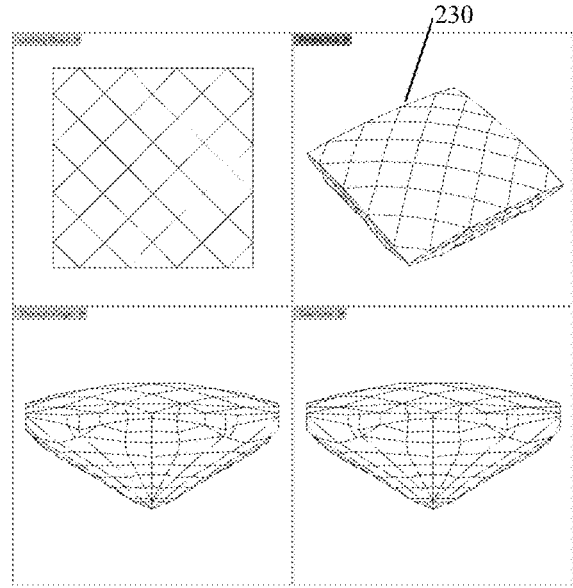
Figure 7C:
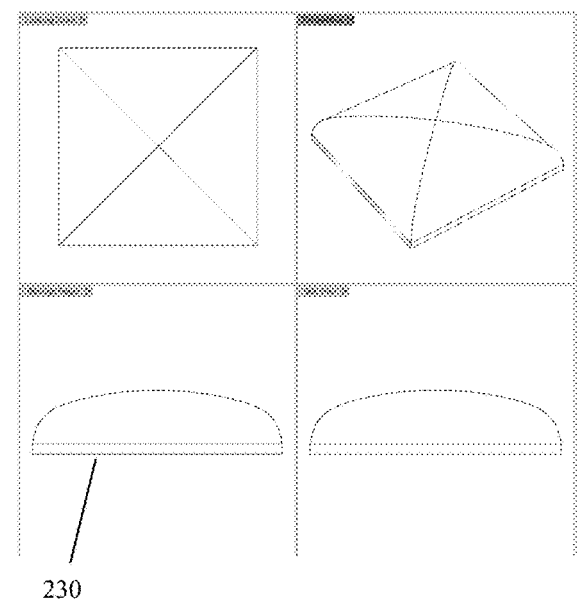
Figure 7D:
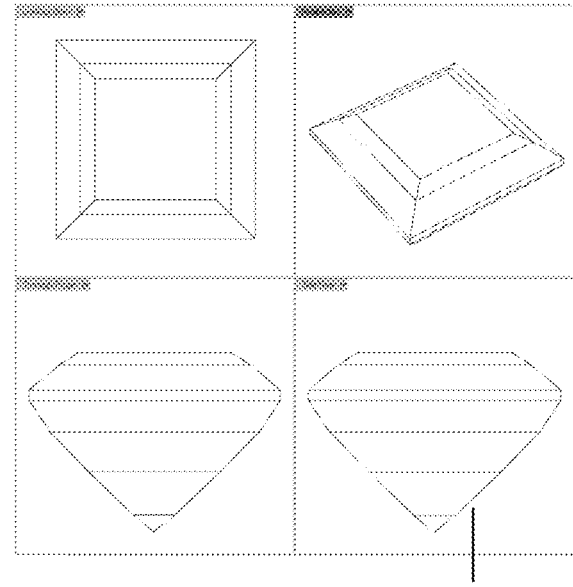

FIG. 5 illustrates that each 3D Base Model 210 is divided into one or more 3D parts called Object IDs 220.

FIGS. 6A-6D illustrate that each Subpart 230 is comprised of one or a group of Object IDs 220. Each generic Subpart 230 comprises one or more generic Assets 240, and each generic Asset 240 comprises a range of Parameters 250. The information 140 associated with the generic Base Model 210, Object IDs 220, generic Subparts 230, generic Assets 240, and range of Parameters 250 (together, "variables") is stored in a database 130. A customized Parameter 350 selected from the range of Parameters 250 is assigned to a generic Asset 240, thereby creating a visualization Asset 340, and the generic Subpart 230 is updated to incorporate the visualization Asset 340, thereby creating a customized Subpart 330. The generic Base Model 210 is updated to incorporate the customized Subpart 330, thereby creating a customized Base Model 310 and a customized product 300.

Exemplary generic Subparts 230 include setting, gemstone, material, placement of gems, number of gems, jewelry findings, and the like. The Subpart information stored includes one or more of the following pieces of Asset information: volumes, size, scale, 3D matrices, 3D transformation matrix, SKU, design attribution, 3D geometry information such as curves, polysurfaces, surfaces, textures, meshes, block instances, and/or B-splines which may be stored as a data field or as serialized data (see FIG. 3). Each of the generic Assets 240 can be assigned customization Parameters 350 selected from a range of Parameters 250 to transform the generic Asset 240 into a visualization Asset 340. This process is shown in FIG. 2A. In the example of jewelry, generic Assets 240 can be generated for each gemstone cut (shape) within the Base Model, in gemstone facet patterns, including but not limited to: diamond cut, step cut, brilliant, checkerboard, and cabochon. For example, FIGS. 7A-D show an exemplary gem Subpart 230 exhibiting four different generic Assets 240.

The information about all of these variables is stored within a database 130 (see FIG. 3). In a preferred embodiment, one or more generic materials are used to create the images for the Base Model 210 and all of its Subparts 230. This makes it possible to see the customizations to the Base Model 210. Preferably, photorealistic images are created using a base (Parameter) material (Asset) for each of the Subparts 230 that, when compiled, make up the Base Model 210, while also identifying and tracking all the associated data for each Subpart 230 that can be used for assembly at a later date.

Some examples of variations to each Subpart 230 could include, but are not limited to, adding another Subpart 230 that can fit into the Base Model 210, adding color overlay to the generic material, adding textures to the generic material, scaling, changing aspects of the 3D matrices and/or 3D transformation matrix and/or adding embellishments without having to reprocess or create additional images of the product. This process for variation of products allows the changing of one or more Parameters or Assets in which only the changed areas of the Subpart 230 are done with 2D image input, or manipulation, which optimizes the speed while tracking these changes in 3D. This 3D information can be used later for, but not limited to, use in manufacturing, additional Asset generation, creating animations, viewing in 3D on a website, sharing for collaboration with others, design approval, etcetera.

If a Base Model has been altered, 2D image(s) of a new customized product exist as well as a new, customized 3D Base Model 310. The customized 3D Base Model 310 is created by assembling all of the customized Subparts 330 into a new viable 3D model 310 that matches the 2D visualization asset(s) 340 of the customized Product 300. This information is passed from server to server in real time. This invention can be used for any product online or offline for consumers or wholesalers to develop a customized Product 300. For example, if used to customize jewelry, the manufacturer could display a series of generic Base Models 210 online. A consumer (e.g., a jewelry shopper or jewelry designer who wants to create a custom brand) can interact with the generic Base Model 210 and all of its generic Subparts 230 to create a customized Base Model 310. For example, by changing generic Subparts 230 and Assets 240 like metal alloys, gemstone types, material options, finishes, jewelry findings such as heads, shanks, earring findings, settings, gemstone shapes and or sizes, one Base Model could have millions of possible iterations.

The code, or instructions, that is used to process the 3D file and extract the data from the Base Model and its Subparts serializes (writes to file) 420 some of the data 140 and assigns 420 this serialized data 140 as a linked data to the database 130. The 3D geometry may be processed by reading and storing the type of geometry (e.g., curve, surface, polysurface, point, block instance, mesh, named objects). Measurements of the Object IDs', Subparts', and Base Models' extents are stored as data 140. Subparts are meshed for volume calculations. Assigned data is read and stored. 3D transformation matrixes are stored. And all associated file data is stored as serialized data for extraction. This process can optimize the speed to enable quicker access and avoid adding information to the database directly as a BLOB (Binary Large OBject) database field.

Figure 8:
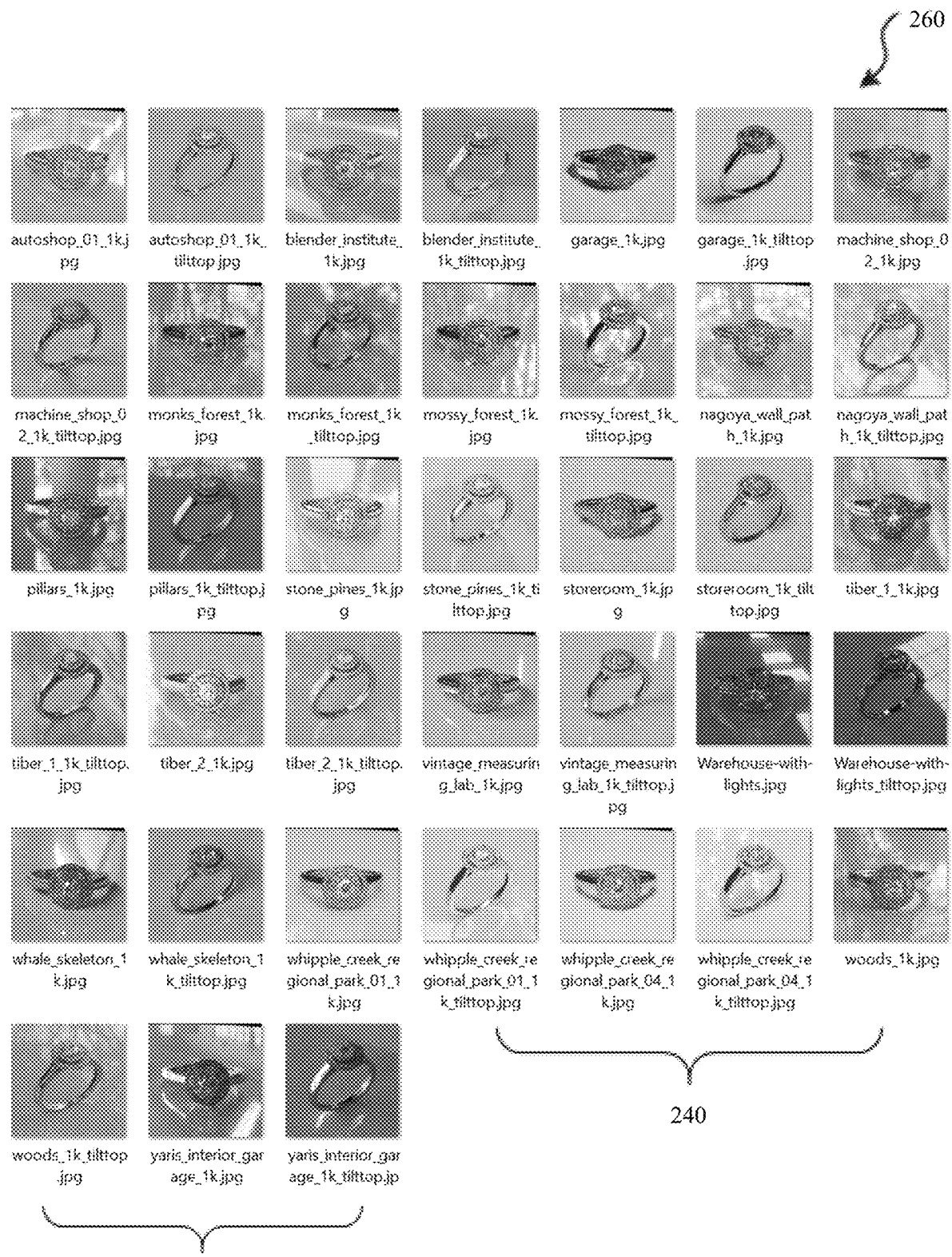
FIG. 8 shows a sample contact sheet comprising a selection of generic Assets illustrating a variety of different HDRI environments and different lighting schemes which are used within templates and material libraries.

The Job Runner initiates the 3D platform to generate visualization Assets of the Base Model and all of its Subparts. A materials library (also called a "library of materials") 154 comprising materials specifically developed utilizing scientific values and measurements in conjunction with different program settings in combination with high-dynamic-range imaging ("HDRI") maps and lighting schemes—may be applied to the generic and/or customized 3D Base Model and all of its generic and/or customized Subparts. Altering each Parameter and/or HDRI map and/or lighting can elicit drastically different visualization Assets (see FIG. 8, showing a sample contact sheet 260 comprising a selection of generic Assets illustrating a variety of different HDRI environments and different lighting schemes which are used within templates and material libraries). A variety of default Parameters may elicit aesthetically pleasing yet varying visualization Assets results due to the differences in the settings/HDRI/lighting choices. In various embodiments, material libraries relating to jewelry may include a set of jewelry materials, such as metal alloys, precious and semi-precious gemstones, enamels, patinas etc.

Predetermined combinations of Assets and Parameters can be used to create a Template 156. A Template can be specified within the Job Runner application 152 interface (FIG. 4). Subparts 350 can be specified and used within the Template 156. When initiating the visualization Asset generation component 150, each Template 156 comprises, but is not limited to, the type of job, for instance, a 3D manufacturing asset component 160, or particular visualization Assets 340 (e.g., animation, still image, movie, 3D model, radial animation, etc.), customized Parameters (e.g., lighting scheme(s), HDRI map(s), background, shadow type, resolution, number of samples, output type, number of frames, camera and target points, etc.). In a preferred embodiment, the Template 156 determines the overall look of the visualization Asset, the size of the Asset, and the type of Asset. For example, Parameters of an animation template might include the actual animation path (e.g., product falling from the sky, camera zooming in), frames (e.g., how smooth), visualization Asset (e.g., mp4 movie format), etc.

Multiple HDRI and lighting schemes can be specified within a Template 156. In the example of jewelry, each Template 156 creates visualization Assets 340 in multiple lighting schemes and HDRI maps (see FIG. 8). The resulting Assets (FIG. 9, for example) can be used independently or in combination to add, remove, filter or blend aspects of the visualization Asset 340. The result of this process, as an example can depict a level of realism that mimics retouched photography. In a preferred embodiment, the Template 156 includes multiple lighting schemes and HDRI maps (for example, see FIG. 11, which shows glamor white, industrial, station, grotto, and studio HDRIs), one of which generates a highly reflective image of a ring where the camera lens is present in the HDRI map and is therefore reflected into the metal ring within the visualization Asset, resulting in an undesirable reflection, however the level of polish within the metal in the resulting visualization Asset is desired. Another visualization Asset of the same ring generated using a different HDRI map may depict the metal in a less reflective matte finish but the undesired reflection is not present. Filtering out the undesired aspect(s) of one Parameter while incorporating the desired aspects of another Parameter combined together creates an optimized result and eliminates the need to retouch the visualization Asset 340.

A library of materials 154 can be used in conjunction with the Template 156 to generate a wide range of visualization Assets 340. The Parameters 350 used to create the visualization Assets 340 can range from photorealistic images, to technical drawings, to concept sketches, etc. In a preferred embodiment, this method of enhancing Parameters 350 of the visualization Assets 340 by combining and/or filtering the visualization Assets 340 created utilizing multiple HDRI and lighting schemes is used to create a vast material library 154 of photorealistic and metal alloys and gemstone materials. In a preferred embodiment, the Parameters 350 used to create a material library use scientifically accurate Parameters 350 such as Index of Refraction ("IOR") values, optical properties, and physical properties. In the preferred embodiment, image maps with scientifically accurate depiction of the metal or mineral specimen for example inclusion types (feathers, cloud, needle, graining, etc.) may be included. This result of incorporating the scientific properties within the material library 154 generates scientifically and anatomically correct depictions of a product.

Generally, the overall look and feel of an image is determined by the direct and indirect lighting, the HDRI map, the material library 154, the ground plane (surface on which an item sits), the shadow, reflection, etc. The Parameters 350 used to create different visualization Assets 340 can be combined together in unique ways to create different branded looks. In a preferred embodiment, this method of enhancing Parameters 350 of the visualization Assets 340 by combining and/or filtering multiple visualization Assets 340 created using multiple HDRI and lighting schemes, the background, the shadow, and the material library 154 together create drastically different branded looks. In the preferred embodiment the ranges of polish, brightness, dramatic lighting effects, etc. are used to depict a limitless variety of branded looks.

Visualization Assets 340 can also include 1) finishes (image maps and procedural maps), comprising a range of Parameters such as polished, satin, beadblast, hammer, brushed, etc.; 2) design details, comprising a range of Parameters such as engraving, filigree, milligrain, carved, enamel/inlay, etc.; and 3) other Parameters such as 3D transformation matrices.

Figure 9:
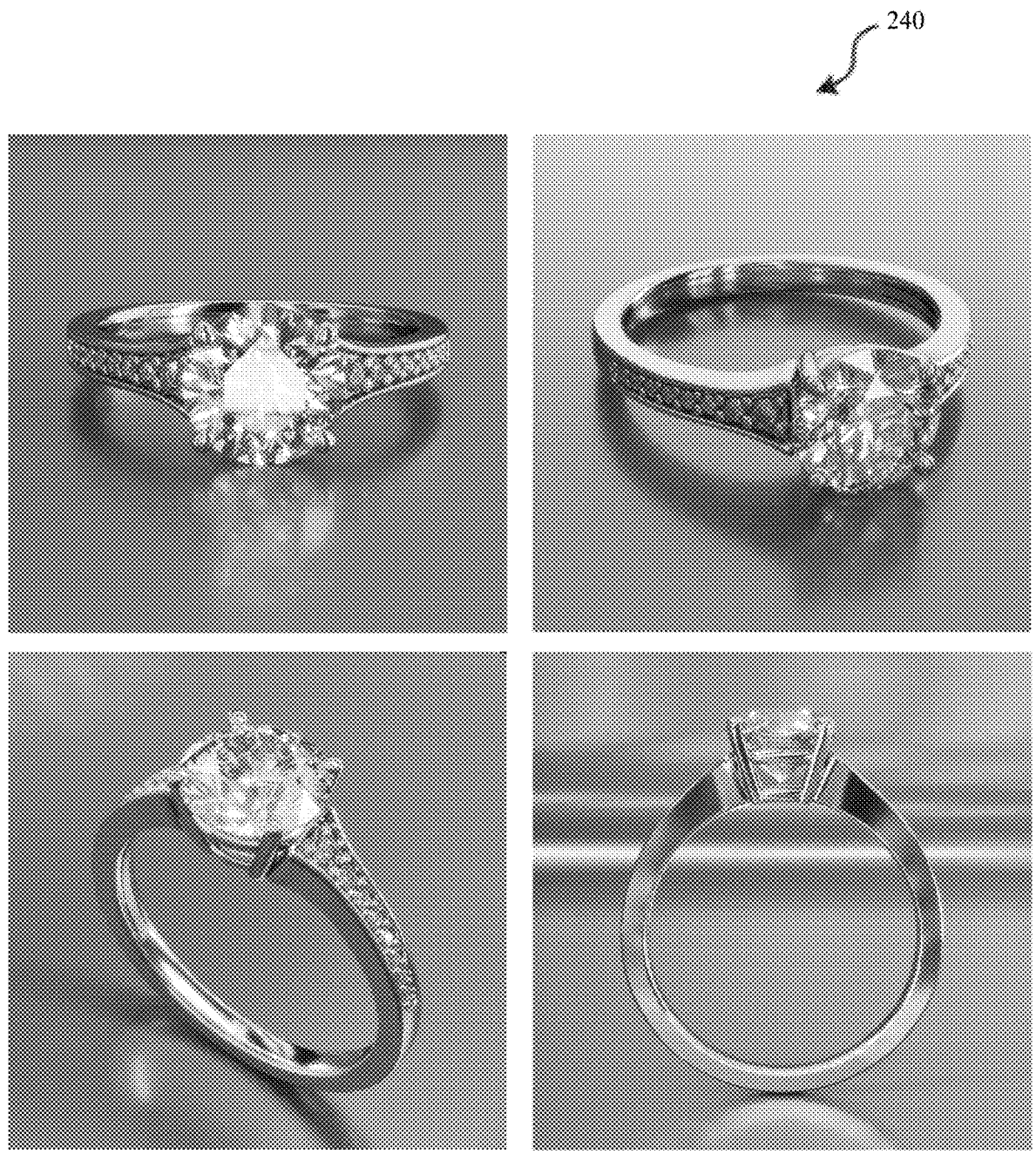
FIG. 9 shows a sample of 2D generic Assets created from a 3D Base Model using a lighting scheme titled 'Station' and displayed in a generic base material.
Figure 10:
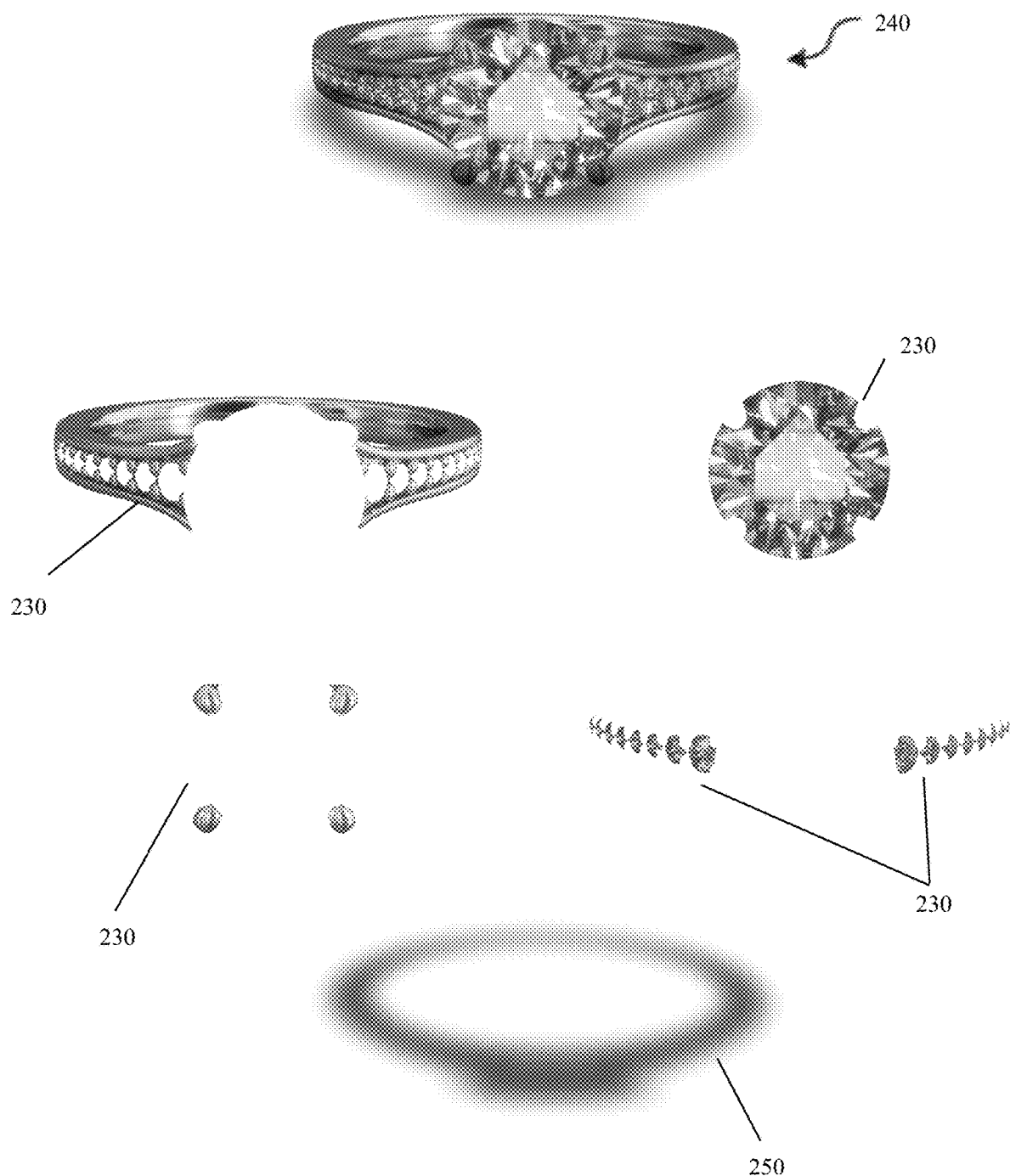
FIG. 10 shows 2D generic Assets generated using the Job Runner application and the 3D input Base Model comprised of its Subparts from FIG. 5 displayed in the generic base materials from a specific template.

When the Job Runner 152 creates visualization Assets 340, regardless of the application settings and/or Template 156, all visualization Assets 340 may be completed in a generic base material. FIG. 9 shows a sample of the 2D generic Assets created from a 3D Base Model using a lighting scheme titled 'Station' and displayed in a generic base material (white metal with white gemstones). In the example of jewelry, a materials library 154 generates visualization Assets 340 in white metal and transparent gemstones (e.g., diamond) Parameters 350. This is so each visualization Asset 340 can be easily customized into any alloy and any gemstone taking into account the gemstone's Index of Refraction ("IOR"). It is generally easier to add color than to take it out of a visualization Asset 340. The results of using a material library 154 that applies scientifically accurate Parameters such as the IOR result in a photorealistic visualization Asset 340 for example. In the case of handbags, the base material might be created in white, matte finish so Parameters can be altered to create visualization Assets in different looks by adding woven texture maps, leather maps, different hues, etc. The resulting visualization Asset 340 can include .jpg, .png, .mp4, .exr, and serialized 3D files. The associated files can be used to create the customized images for the Base Model 310 and all of its Subparts 330. This makes it possible to add more customization in the future to the Base Model. Based on assignment Parameters within the 3D files, each of the Subparts may be divided out automatically, including the shadow and the background. The shadow and the background may be Parameters (because aspects may be controlled) and/or Assets (because it may be exported as a separate entity). A set of compiled customized Subparts 330 creates the complete customized Base Model 310. FIG. 10 shows the 2D images generated using the Job Runner application and the Base Model comprised of its Subparts from FIG. 5 displayed in the generic base materials.

Templates 156 can be used to create visualization Assets 340 for different industries or product types. For example, in the event of handbags, a Template 156 could be created to generate visualization Assets using Parameters such as handbag shapes, sizes, colors, and Subparts such as straps, handles, latches, pockets, dividers, etc. The generic Assets 240 could be customized using Parameters within the material library 154 applying them to the handbag. Generic Subparts 230 such as latch types (e.g., tassels, locks, and toggle), interior and exterior pocket shapes and sizes, internal storage dividers can be applied. Parameters such as strap length, strap types (chain or fabric), leather or fabric material types, material colors, or any other customization options that are important to the desired product and visualization outcome may be applied. A range of Parameters 250 includes specific options for each generic Subpart and resulting Asset 240.

In a preferred embodiment, the Template 156 determines the type of Asset including but not limited to 4K and high-definition video, still images for use on-line and/or in print, as well as bill of material (BOM), 3D CAD files, manufacturing files 260 etc. that can directly initiate manufacturing or be displayed online or in print. These Assets are created using a variety of metal alloys, precious and semi-precious gemstones, resins and enamels and patinas and/or jewelry plating.

Each generic Subpart 230 can be manipulated (for example, see FIG. 11, which comprises an OpenEXR 270 and part of a material library 154 with its corresponding 2D generic Asset and a range of possible Parameters) to create a newly customized Base Model 310 (FIG. 12A), while also identifying and tracking all the associated data for each Subpart 330 so that it may be used for physical assembly at a later date (FIG. 1). Further customization of Subparts 330 could include, but are not limited to, adding another Subpart that can fit into the Base Model using identifying geometry such as, but not limited to a point, a bounding box, an offset or a named object (FIGS. 14A, 14B), compositing material options using common photo editing tools (FIGS. 12A, 12B) (including but not limited to these Parameters: hues, saturation, offsets, bokeh, brightness, gamma, alpha etcetera), adding image maps, adding textures, scaling, changing aspects of the 3D matrices and/or 3D transformation matrix (FIGS. 13A, 13B) and/or adding embellishments without having to reprocess the original 3D input file.

Figure 13A:
FIGS. 13A and 13B show a range of parameters.
Figure 13A:
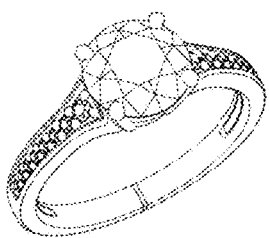
Figure 13A:
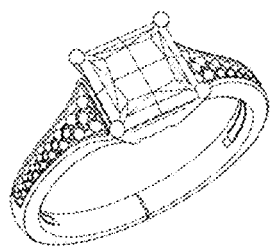
Figure 13A:
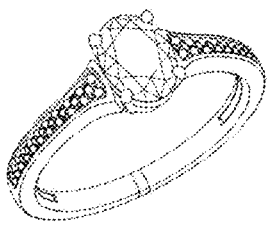
Figure 13A:
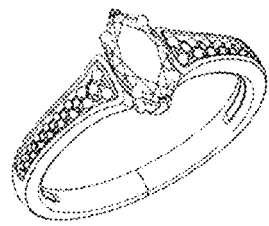
Figure 13A:
Figure 13A:
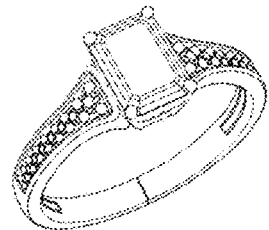
Figure 13A:
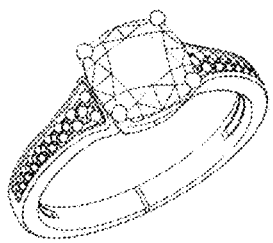
Figure 13A:
Figure 13B:
Figure 14A:
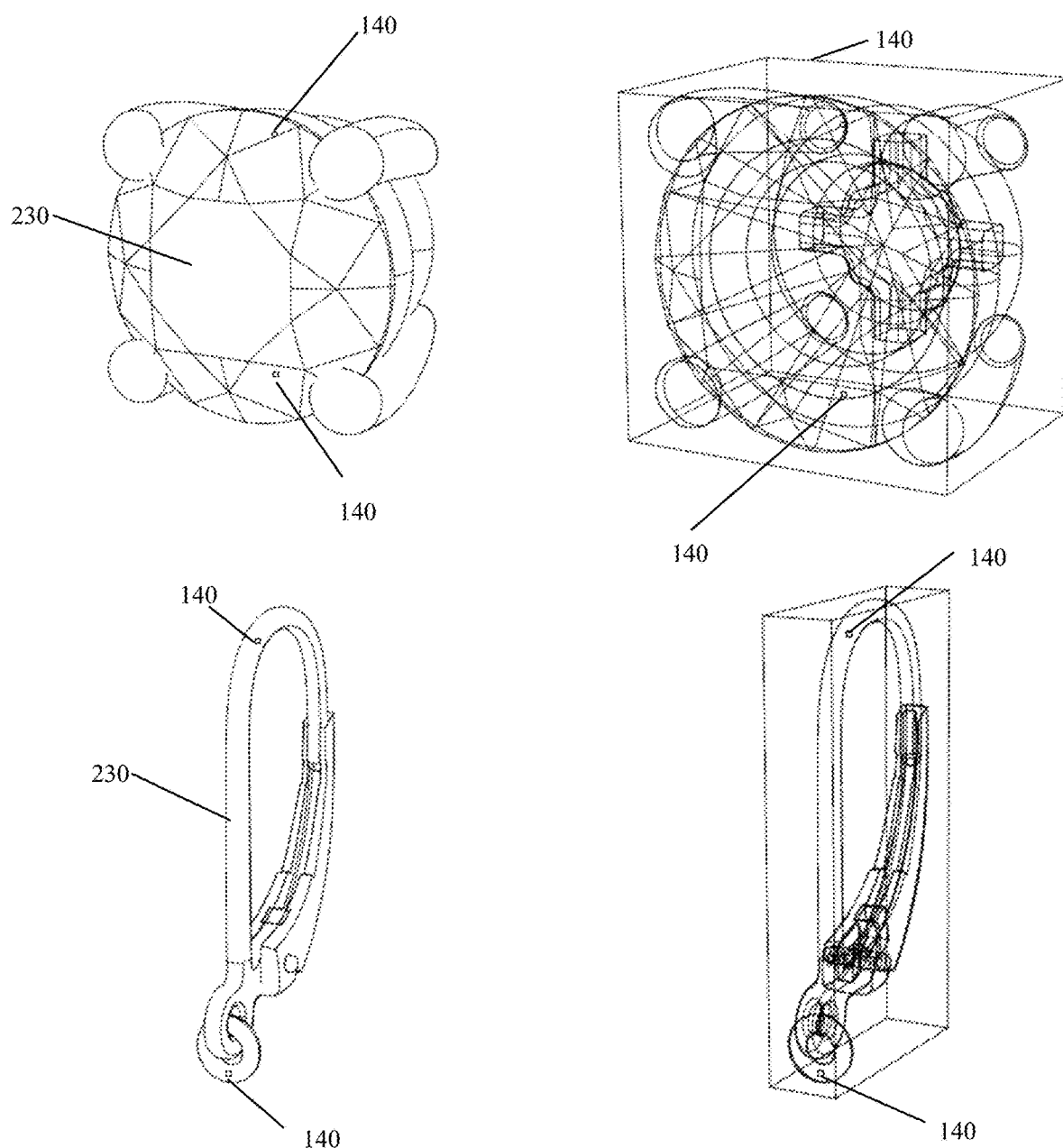
FIG. 14A shows an example of two generic Subparts with example data.
Figure 14B:
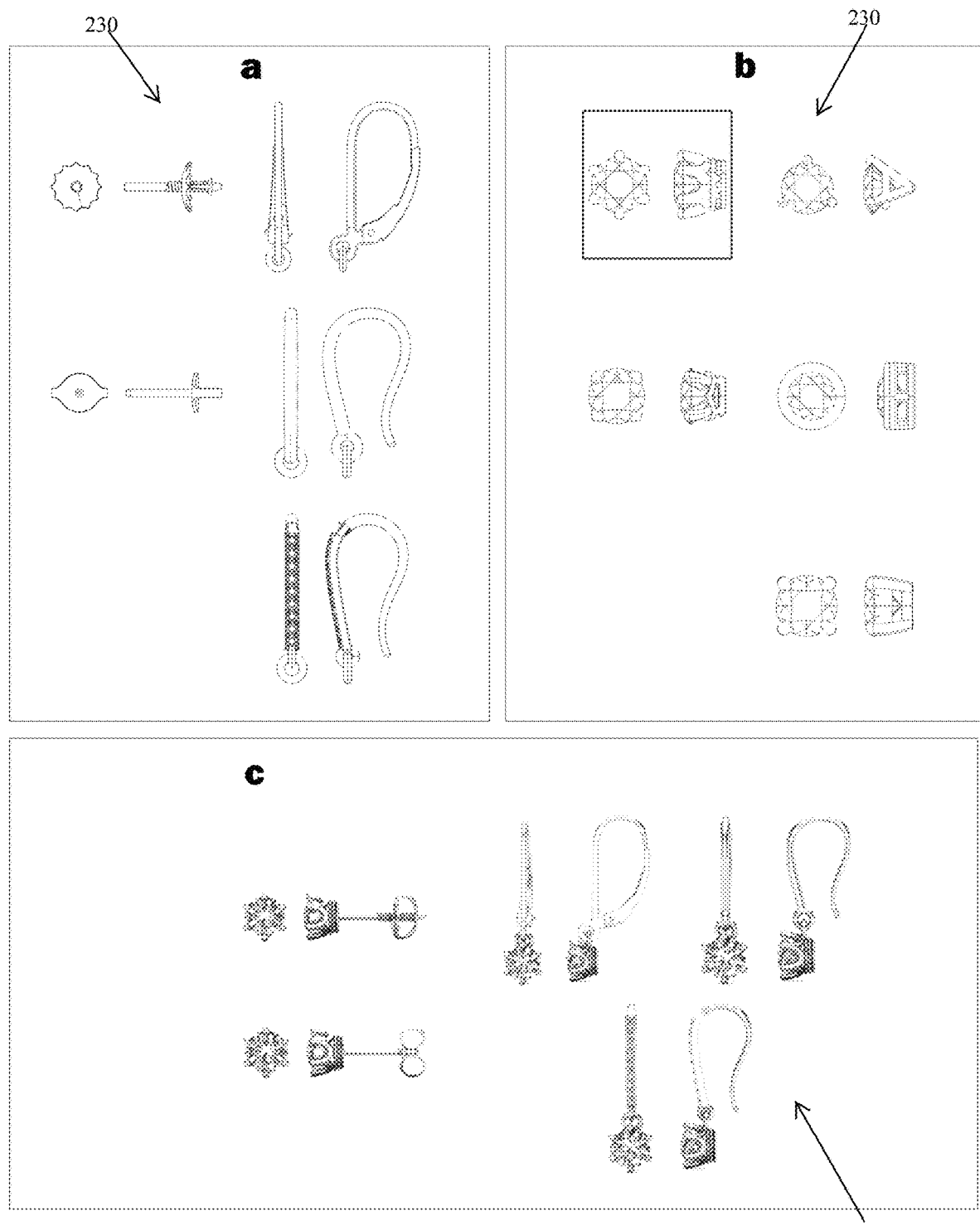
FIG. 14B shows a sample where one generic Subpart from group A is combined with another generic Subpart from group B to create a customized Base Model and customized Product, group C.
Figure 15A:
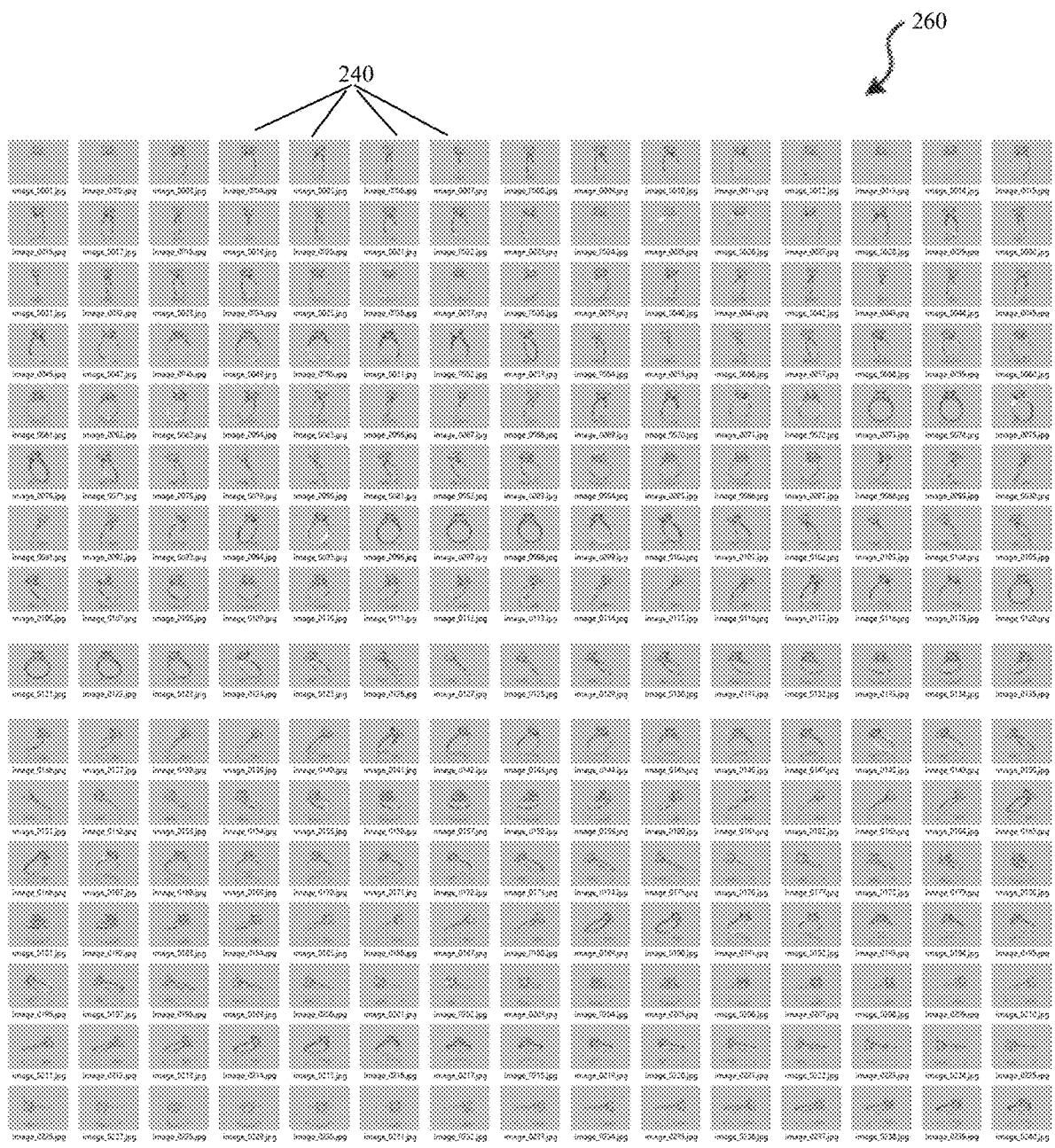
FIG. 15A shows a contact sheet of 2D generic Assets generated by a 'Radial Animation' template and manipulation of the generic base materials, background and shadow composited in white metal and diamond.
Figure 15B:
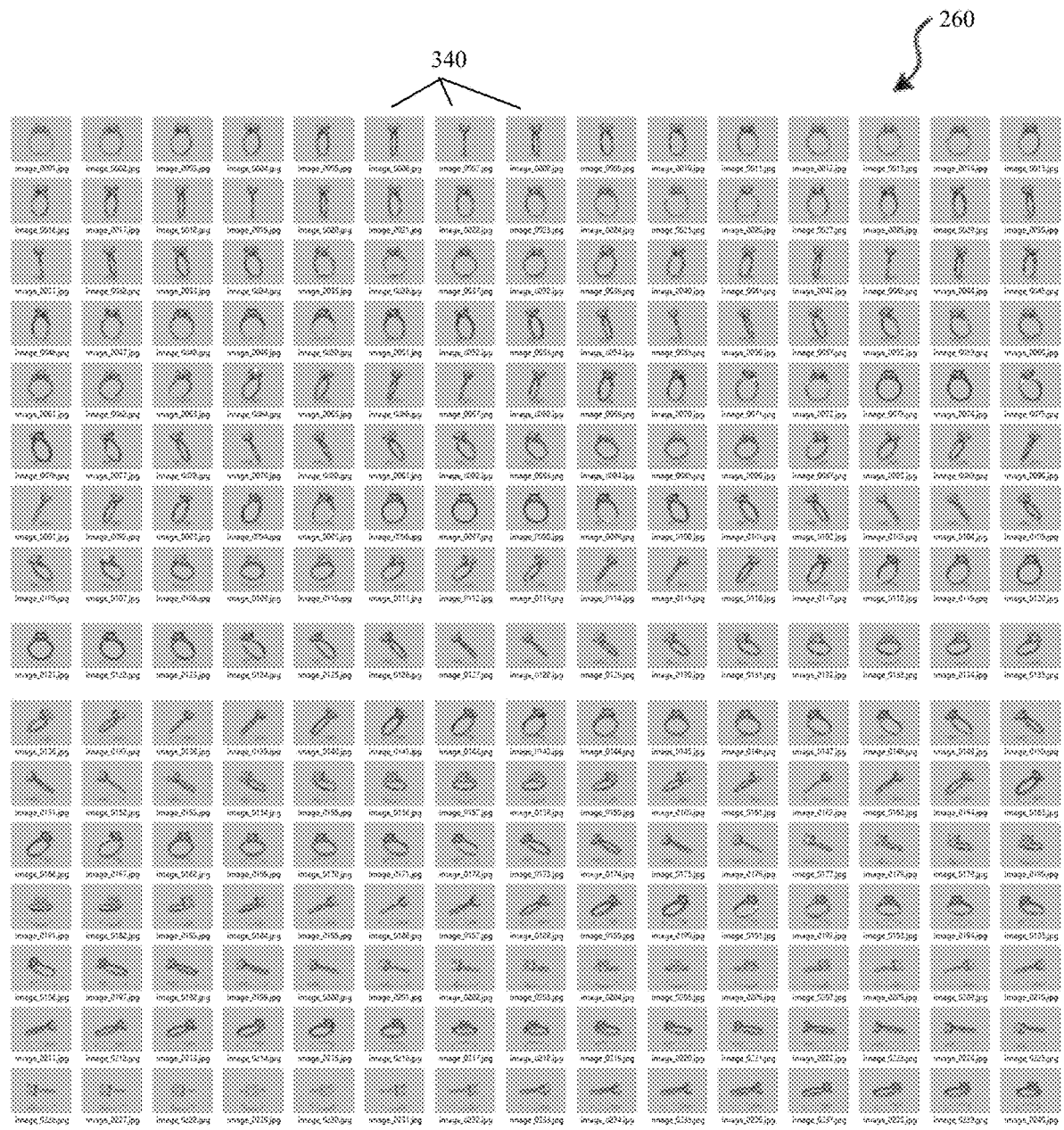
FIG. 15B shows a contact sheet of 2D visualization Assets generated by the 'Radial Animation' template and customization to the generic base materials, background and shadow composited in yellow metal and diamond.

FIG. 12A shows sample customization to the generic base material; this figure demonstrates color manipulation, but the possible manipulation is not limited to color and could include textures, backgrounds, embellishments, transformations, etc. added to the Base Model or any Subpart. FIG. 12B shows a detailed view of sample pre-mixed metal materials to create possible metal iterations as seen in FIG. 12A. FIGS. 13A and 13B show a range of parameters. FIG. 14A shows an example of two generic Subparts with example data. This could be a point measurement based on the extents of its width, height or depth 3D matrices, 3D transformation matrix, SKU, design attribution, or any of the data included within the serialized data. FIG. 14B shows a sample where one generic Subpart from group A is combined with another Subpart from group B to create a customized Base Model and customized Product, group C. This process can occur with any number of groups which can comprise any number of Base Models and or Subparts. FIG. 15A shows a contact sheet 260 of 2D Assets generated by a 'Radial Animation' template and manipulation of the generic base materials, background and shadow composited in white metal and diamond. FIG. 15B shows a contact sheet 260 of 2D Assets (as seen in 14A) generated by the 'Radial Animation' template and customization to the generic base materials, background and shadow composited in yellow metal and diamond.

As discussed above, each generic Asset 240 comprises a range of Parameters 250. For instance, if a generic Asset is "white metal," then a range of Parameters may be: sterling silver, platinum, palladium, 14 karat white gold, 18 karat white gold, 14 karat yellow gold, 18 karat yellow gold, 14 karat rose gold, 18 karat rose gold, rhodium, black rhodium, blue rhodium, etc. In another embodiment, if a generic Asset is "gemstone cut," then a range of Parameters may be: round, square (princess), oval, baguette, marquise, pear, cushion, emerald, asscher, radiant, trilliant, heart, and different facet patterns such as diamond cut, brilliant, step cut, checkerboard, and cabochon. If a generic Asset is "gemstone," then a range of Parameters may be emerald, ruby, sapphire, alexandrite, amethyst, aquamarine, citrine, garnet, iolite, morganite, opal, peridot, spinel, topaz, tourmaline, turquoise, and zircon.

A customized Parameter 350 selected from the range of Parameters 250 may be assigned to a generic Asset 240, thereby creating a visualization Asset 340. For instance, "pear" may be assigned to the generic "gemstone cut" Asset, creating a visualization Asset. Or, "checkerboard" may be assigned to the generic "gemstone facet pattern" Asset, creating a visualization Asset. The generic Subpart 230 is updated to incorporate the visualization Asset 240, creating a customized Subpart 330. Likewise, the generic Base Model 210 is updated to incorporate the customized Subpart 330, creating a customized Base Model 310 of a product. In a preferred embodiment, the customized Subpart 330 incorporates two or more visualization Assets 340.

This process for customization of products can allow the changing of one or more Subparts in which only the changed areas of the Subpart are done with 2D image manipulation (FIGS. 12A and 12B) which can optimize the speed at which the Asset is generated and updated while tracking these changes in 3D. This 3D information can be used later for manufacturing or other relevant purposes such as additional Asset generation, animations etcetera (15A, 15B). After the Subpart or Subparts of a Base Model have been altered, the image(s) of the newly customized product exists as well as the new 3D model by assembling all the Subparts into a new viable 3D model that matches the 2D image(s) of the product. This information is passed from server to server in real-time.

The information associated with the generic Assets 240 and range of Parameters 250 is stored in a database 130. This way, a customized Base Model 310 is displayed very quickly once a customized Parameter 350 is selected. Instead of a user waiting for an entire Base Model to refresh and reload, a single Subpart is quickly and seamlessly updated.

Figure 16C:
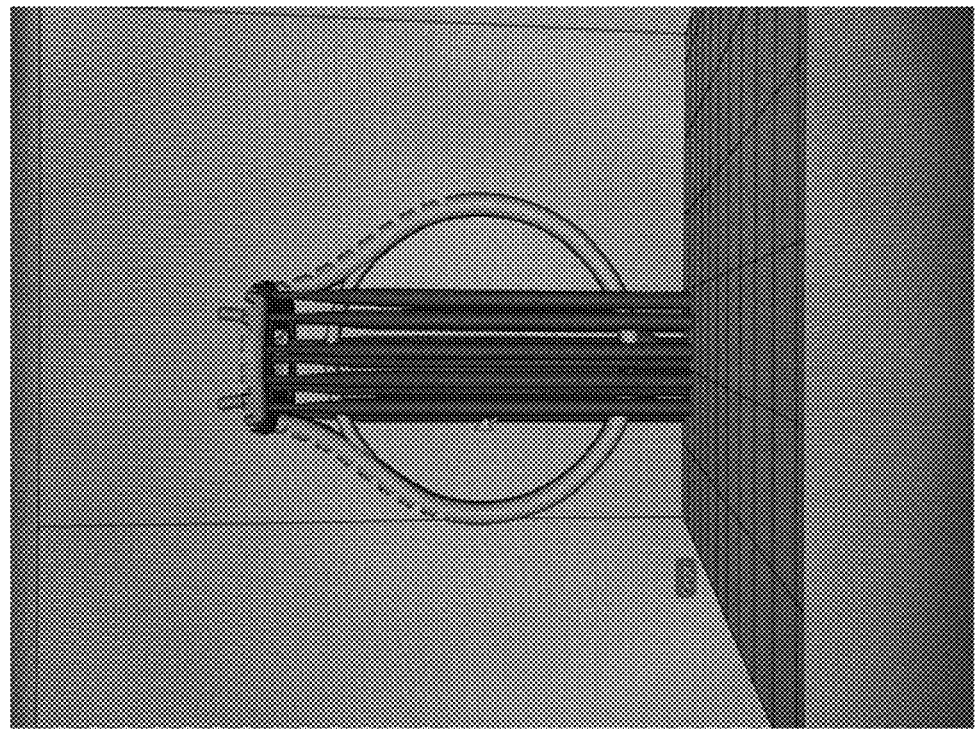
FIGS. 16A-16C show, from left to right, a Base Model prepared for display, the Base Model prepared as a 3D manufacturing asset, and a 3D manufacturing file.
Figure 16B:
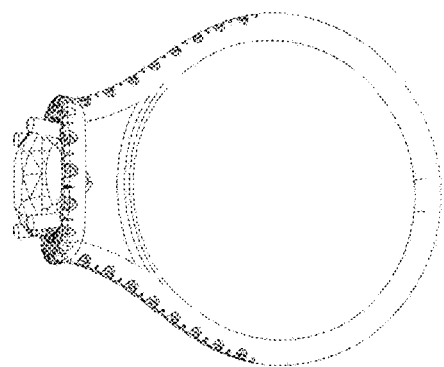
Figure 16A:
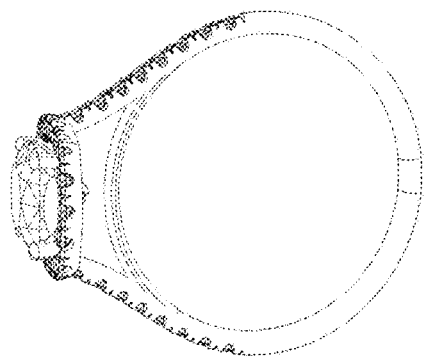

The manufacturer can reduce the timeframe to manufacture the customized product because they do not need to edit or update the 3D model to reflect the consumers' desires. As shown in FIGS. 16A-16C, the manufacturing asset component 160 provides one or more of the following: a display of the Base Model 310, a 3D manufacturing file 360, a gem map 370, a bill of materials 380, and the Base Model prepared as a 3D manufacturing asset 390 (ready to be sent to an output device. The manufacturing processes and requirements can be streamlined because the error checking, bill of materials ("BOM") 380, and 3D manufacturing files 360 already exist (see FIG. 16B, 16C). The manufacturer's optimization of resources, time and quality reduce the cost of the customized item can therefore reduce the final cost to the consumer. The consumer can visualize the item they are creating eliminating the anxiety associated with designing a custom item. The timeline for receiving the customized product is reduced. The consumer becomes a critical part of the design process adding an element of ownership to the product. The experience the consumer has while shopping is heightened building brand loyalty back to the manufacturer and or seller. For example, a consumer can use a system and method of the present invention to create the exact product he desires, for instance, a family jewelry item. He is able to obtain custom pricing and a custom BOM 380. He may choose to order the item (via a 3D manufacturing asset 390 which can communicate with one or more output devices 194) and pick it up from a kiosk at a local grocery store or mall. Or, he may take the 3D CAD manufacturing file 360, gem map 370, and bill of materials 380 to his local family jeweler and have them manufacture the jewelry item.

Figure 17:
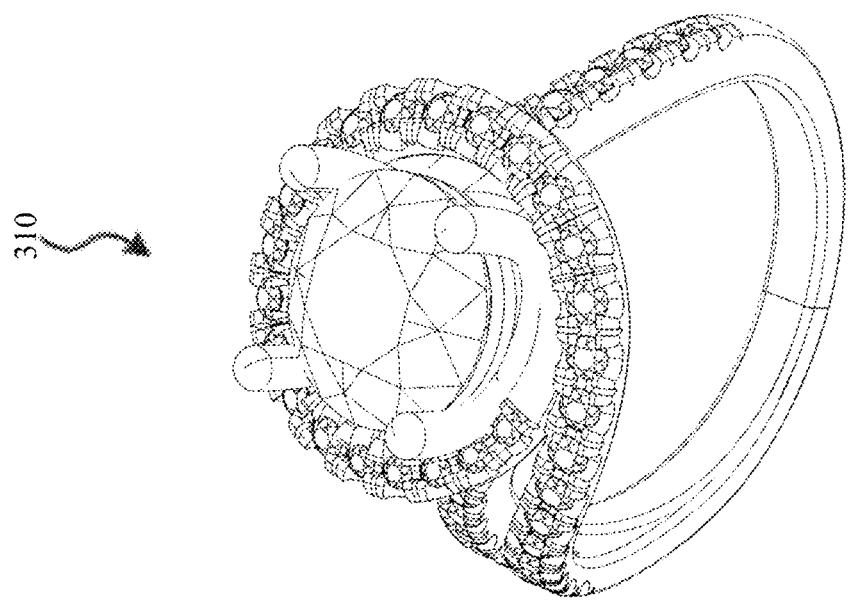
FIG. 17 shows an exemplary gem map for a manufacturer instructing where each gem goes and a bill of materials corresponding to a customized Base Model.
Figure 17:
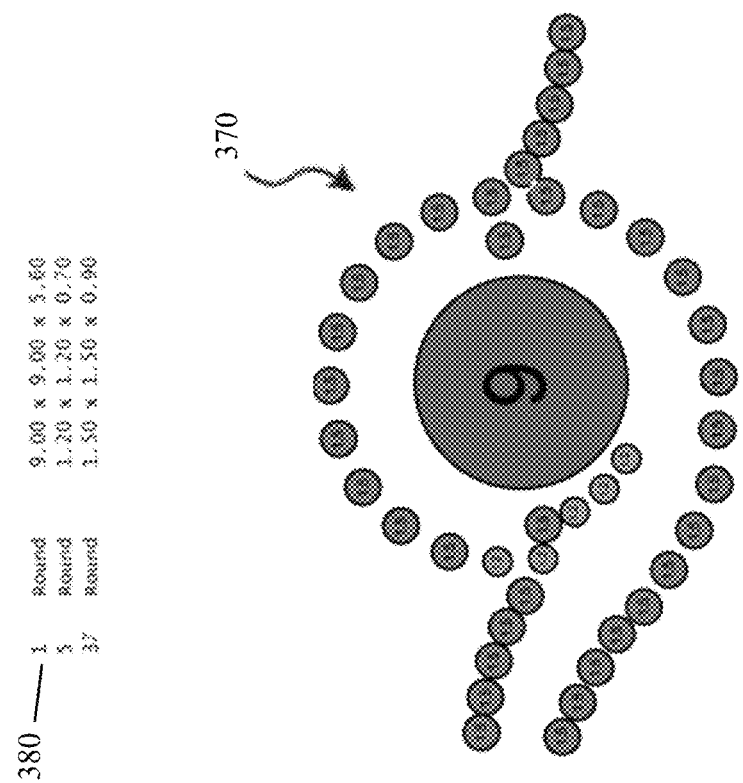

FIG. 16 shows, from left to right, a Base Model prepared for visualization Asset generation 310, the Base Model prepared as a 3D manufacturing asset 390 (note the prongs are taller), and a 3D manufacturing file 360 (note the gems are gone and the supports for the 3D printing process are included) wherein the manufacturing asset component is ready to be sent to an output device 194. FIG. 17 shows an exemplary gem map 370 for a manufacturer instructing where each gem goes and a bill of materials 380 relating to a customized Base Model 310.

Exemplary generic Assets for a "gemstone" generic Subpart include size, weight, cut, color, type of stone, and the like. For the generic Asset "gemstone size," Parameters may comprise 0.005-0.25 carat ("ct") for melee gemstones; 0.25ct, 0.50ct, 0.75ct, 1.0ct, 1.25ct, 1.5ct, 1.75ct, 2.0ct, 2.5ct, 3.0ct etc., or a custom size for round, princess, asscher, trilliant, or heart cuts; 5×3 mm, 6×4 mm, 7×5 mm, 7.5×5.5 mm, 8×6 mm, 9×7 mm, 10×8 mm, 11×9 mm, or a custom size for emerald, oval, or radiant cuts; 6×3 mm, 8×4 mm, 9×4.5 mm, 10×5 mm, 12×6 mm, 13.5×6.75 mm, 14×7 mm, 16×8 mm, or a custom size for marquise cuts; and 5×3 mm, 6×4 mm, 7×5 mm, 8×5 mm, 9×6 mm, 10×7 mm, 10.5×7.25 mm, 12×8 mm, 14×9 mm, or a custom size for pear cuts. Exemplary generic Assets for a "material" generic Subpart include metal type, karat, grade, and the like. Volumes convert into gram, dwt, karat and carat based on the specific gravity of the alloy and or mineral.

Exemplary generic Assets for a "jewelry findings" generic Subpart include earring components (Parameters may include friction post, threaded post, tension backs, screw backs, omega clip, lever back, hinged earwire, earwires, shepherd hooks, etc.); clasp components (Parameters may include spring rings, lobster claws, bayonet, barrel, box, FIG. 8, toggle, s-hook, magnetic, etc.); sockets or heads (Parameters may include basket (3 prong, 4 prong, 6 prong, 8 prong, etc.), bezel, peghead (3 prong, 4 prong, 6 prong, 8 prong, etc.), half-bezel, illusion, trellis, martini, etc.); chains (Parameters may include anchor, byzantine, ball, box, cable, cascade, cocoon, curb, figaro, foxtail, herringbone, omega, popcorn, rolo, rope, serpentine, snake, Singapore, spiral, wheat, etc.); chain length (Parameters may include 6.5-, 7-, 8-, 8.5-, 14-, 16-, 18-, 20-, 22-inch, etc.); ring shanks (Parameters may include (round and soft-square) in straight, tapered, reverse-tapered, pinched, flair, bypass, split, freeform, cathedral, etc.); and the like.

To illustrate the present invention, in one embodiment, the generic Base Model is a ring. Exemplary generic Subparts for a "ring" generic Base Model include band, solitaire, bridal set, 3-stone, halo, fashion, signet, semi-mount, setting, gemstone, and the like. Exemplary generic Assets for a "band" generic Subpart include wedding band, men's band, anniversary band, eternity band, and the like. Exemplary generic Assets for a "setting" generic Subpart include gem shape, gem placement, gem orientation, gem count, ring size, side shank thickness, bottom shank thickness, shape of ring exterior, ring profile top height, ring profile bottom width, gemstone size, and the like. For the generic Asset "ring size," Parameters may comprise sizes 3 through 12 in quarter-size increments (e.g., 3, 3¼, 3½, 3¾, 4, 4¼, 4½. . . 11½, 11¾, 12) (C-Z in the UK/Australia etc., all are based on inside diameter) or any custom size or any international size reference.

In another illustrative embodiment, the generic Base Model is a necklace. Customizing a generic Subpart "jewelry finding" comprises changing a generic Asset "clasp" on a generic Base Model "necklace" from a Parameter "spring ring" to a customized Parameter "lobster claw" to create a visualization Asset "clasp" and display a lobster claw as the customized Subpart "jewelry finding."

In certain embodiments of the present invention, along with displaying a customized 3D Base Model, one or more relevant human body parts such as wrist, finger, neck, arm, ear, nose, lip, belly button, ankle, toe, face, etc. may be displayed. The body part(s) may be included to allow a user to virtually "try on" a customized product. Because the systems and methods of the present invention are more efficient than current state of the art, the ability to scale, rotate view, try on, etc. is increased.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, details of the invention may not be described in the specification or depicted in the drawings in more detail than is necessary to provide a fundamental understanding of the invention and make apparent to those of ordinary skill in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. As such, the claims below shall be read to include all obvious variations and modifications that may be within the spirit of this invention.

What is claimed is:

1. A computing system of bridging two-dimensional and three-dimensional technologies for customized product visualization and manufacturing, comprising:
   one or more computer-readable storage mediums storing computer-executable instructions for controlling the computing system to:
   a) prior to a user creating a customized product, generate a three-dimensional generic base model of a product,
      i) wherein the generic base model comprises one or more three-dimensional generic subparts,
      ii) wherein each generic subpart comprises one or more generic assets,
      iii) wherein each generic asset can accommodate a range of parameters,
   b) during the user creating a customized product, modify the three-dimensional generic base model using two-dimensional image manipulation,
      i) wherein a customized parameter selected from the range of parameters is assigned to a generic asset, thereby becoming a visualization asset,
      ii) wherein the generic subpart is dynamically updated to incorporate the visualization asset, thereby becoming a customized subpart,
      iii) wherein the generic base model is updated to incorporate the customized subpart, thereby becoming a customized base model of a customized product,
   c) create a three-dimensional customized base model of a customized product, and one or more processors for executing the computer-executable instructions stored in the one or more computer-readable storage mediums.

2. The computing system of claim 1, wherein a template is used to assign customized parameters to one or more generic assets, subparts, object IDs, or combinations thereof.

3. The computing system of claim 1, wherein the three-dimensional customized base model comprises a three-dimensional manufacturing asset which may be used to manufacture the item.

4. The computing system of claim 1, wherein the visualization asset is a two-dimensional image of a three-dimensional CAD model.

5. The computing system of claim 1, further comprising at least one library of materials unique to jewelry and gemstones, comprising scientifically-accurate index of refraction parameters.

6. The computing system of claim 1, wherein a lighting scheme comprising two or more high-dynamic-range image maps used in combination is applied to the visualization asset.

7. The computing system of claim 1, wherein the product is an article of jewelry.

8. The computing system of claim 1, wherein each generic subpart is associated with multiple object IDs, and wherein each object ID is tracked.

9. The computing system of claim 1, wherein each generic subpart is associated with one or more object IDs and its measurement, volume, and three-dimensional transformation matrix information.

10. A computing system of bridging two-dimensional and three-dimensional technologies for customized product visualization and manufacturing, comprising:
one or more computer-readable storage mediums storing computer-executable instructions for controlling the computing system to:
 a) prior to a user creating a customized product, generate a three-dimensional generic base model of a product,
  i) wherein the generic base model comprises one or more three-dimensional generic subparts,
  ii) wherein each generic subpart comprises one or more generic assets,
  iii) wherein each generic asset can accommodate a range of parameters,
 b) during the user creating a customized product, modify the three-dimensional generic base model using two-dimensional image manipulation,
  i) wherein a customized parameter selected from the range of parameters is assigned to a generic asset, thereby becoming a visualization asset,
  ii) wherein a lighting scheme comprising two or more high-dynamic-range image maps used in combination is applied to the visualization asset,
  iii) wherein the generic subpart is updated to incorporate the visualization asset, thereby becoming a customized subpart,
  iv) wherein the generic base model is updated to incorporate the customized subpart, thereby becoming a customized base model of a customized product,
 c) create a three-dimensional customized base model of a customized product, and one or more processors for executing the computer-executable instructions stored in the one or more computer-readable storage mediums.

11. The computing system of claim 10, wherein a template is used to assign customized parameters to one or more generic assets, subparts, object IDs, or combinations thereof.

12. The computing system of claim 10, wherein the three-dimensional customized base model comprises a three-dimensional manufacturing asset which may be used to manufacture the item.

13. The computing system of claim 10, wherein the visualization asset is a two-dimensional image of a three-dimensional CAD model.

14. The computing system of claim 10, further comprising at least one library of materials unique to jewelry and gemstones, comprising scientifically-accurate parameters.

15. The computing system of claim 10, wherein the product is an article of jewelry.

16. A computing system of bridging two-dimensional and three-dimensional technologies for customized product visualization and manufacturing, comprising:
one or more computer-readable storage mediums storing computer-executable instructions for controlling the computing system to:
 a) create at least one library of materials unique to jewelry and gemstones, comprising scientifically-accurate index of refraction parameters,
 b) prior to a user creating a customized product, generate a three-dimensional generic base model of a product,
  i) wherein the generic base model comprises one or more three-dimensional generic subparts,
  ii) wherein each generic subpart comprises one or more generic assets,
  iii) wherein each generic asset can accommodate a range of parameters selected from the library of materials,
 c) during the user creating a customized product, modify the three-dimensional generic base model using two-dimensional image manipulation,
  i) wherein a customized parameter selected from the range of parameters is assigned to a generic asset, thereby becoming a visualization asset,
  ii) wherein two or more lighting schemes, high-dynamic-range imaging maps, or combinations thereof are applied to the visualization asset,
  iii) wherein the generic subpart is updated to incorporate the visualization asset, thereby becoming a customized subpart,
  iv) wherein the generic base model is updated to incorporate the customized subpart, thereby becoming a customized base model of a customized product,
 c) create a three-dimensional customized base model of a customized product, and one or more processors for executing the computer-executable instructions stored in the one or more computer-readable storage mediums.

17. The computing system of claim 16, wherein a template is used to assign customized parameters to one or more generic assets, subparts, object IDs, or combinations thereof.

18. The computing system of claim 16, wherein the three-dimensional customized base model comprises a three-dimensional manufacturing asset which may be used to manufacture the item.

19. The computing system of claim 16, wherein the visualization asset is a two-dimensional image of a three-dimensional CAD model.

* * * * *